US012409660B2

(12) United States Patent
Saigusa et al.

(10) Patent No.: US 12,409,660 B2
(45) Date of Patent: Sep. 9, 2025

(54) LIQUID DISCHARGING APPARATUS AND WASTE LIQUID TANK

(71) Applicant: BROTHER KOGYO KABUSHIKI KAISHA, Nagoya (JP)

(72) Inventors: Kazushige Saigusa, Nagoya (JP); Shohei Ichikawa, Niwa (JP); Fumiya Nakamura, Nagoya (JP); Kazuma Kobayashi, Nagoya (JP); Masako Kawagoe, Nagoya (JP); Haruhisa Shirai, Kasugai (JP); Asami Hashimoto, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 67 days.

(21) Appl. No.: 18/192,923

(22) Filed: Mar. 30, 2023

(65) Prior Publication Data

US 2023/0311515 A1 Oct. 5, 2023

(30) Foreign Application Priority Data

Apr. 1, 2022 (JP) ................................ 2022-062146

(51) Int. Cl.
*B41J 2/165* (2006.01)
*B41J 2/17* (2006.01)

(52) U.S. Cl.
CPC ......... *B41J 2/16523* (2013.01); *B41J 2/1721* (2013.01); *B41J 2/1728* (2024.05)

(58) Field of Classification Search
CPC ..... B41J 2/16523; B41J 2/1721; B41J 2/1728
See application file for complete search history.

(56) References Cited

U.S. PATENT DOCUMENTS

| | | | | |
|---|---|---|---|---|
| 9,233,543 | B2 | 1/2016 | Hirasawa et al. | |
| 2007/0263051 | A1 | 11/2007 | Kawai et al. | |
| 2014/0036006 | A1 | 2/2014 | Tamaki | |
| 2017/0282568 | A1 | 10/2017 | Osakabe et al. | |
| 2018/0345674 | A1 | 12/2018 | Ochiai | |
| 2019/0016143 | A1* | 1/2019 | Ochiai | B41J 29/17 |
| 2019/0248144 | A1 | 8/2019 | Nakashima et al. | |
| 2020/0189267 | A1* | 6/2020 | Hori | B41J 2/04561 |
| 2023/0311520 | A1* | 10/2023 | Shirai | B41J 29/02 347/36 |

FOREIGN PATENT DOCUMENTS

| | | | | | |
|---|---|---|---|---|---|
| JP | 2007-301756 | A | | 11/2007 | |
| JP | 2014-28497 | A | | 2/2014 | |
| JP | 2017-013356 | A | | 1/2017 | |
| JP | 2017074694 | A | * | 4/2017 | B41J 2/165 |
| JP | 2018-202648 | A | | 12/2018 | |
| JP | 2021-59123 | A | | 4/2021 | |

* cited by examiner

*Primary Examiner* — Sharon Polk
(74) *Attorney, Agent, or Firm* — Merchant & Gould P.C.

(57) ABSTRACT

A liquid discharging apparatus, having a sheet conveyer path, a liquid discharging head including nozzles for discharging liquid, a cap configured to cover the liquid discharging head, a liquid receiver located at a position different from the cap and configured to receive the liquid discharged from the liquid discharging head, and a waste liquid tank demountably mountable in a housing of the liquid discharging apparatus and configured to store the liquid received by the liquid receiver, is provided.

24 Claims, 13 Drawing Sheets

LIQUID DISCHARGING APPARATUS AND WASTE LIQUID TANK

REFERENCE TO RELATED APPLICATIONS

This application claims priority from Japanese Patent Application No. 2022-062146 filed on Apr. 1, 2022. The entire content of the priority application is incorporated herein by reference.

BACKGROUND ART

A liquid discharging apparatus that may discharge liquid from a liquid discharging head to print an image on a sheet is known. The liquid discharging apparatus may have a waste liquid container to collect waste liquid discharged from the liquid discharging head. The waste liquid container may be detachably attached to a housing of the liquid discharging apparatus.

DESCRIPTION

Additionally to the waste liquid container, e.g., a tank, to store the waste liquid collected by a maintenance system, the liquid discharging apparatus may have another tank to store liquid discharged from the discharging head in a flushing process. The tank to store the waste liquid produced in the flushing process may not be detachable from the liquid discharging apparatus; therefore, once the tank is filled with the waste liquid, the liquid discharging apparatus may no longer be usable.

The present disclosure is advantageous in that a liquid discharging apparatus, which is usable even after a tank is filled with waste liquid produced in a flushing process, is provided.

Figures 12A, 12B, 12C:
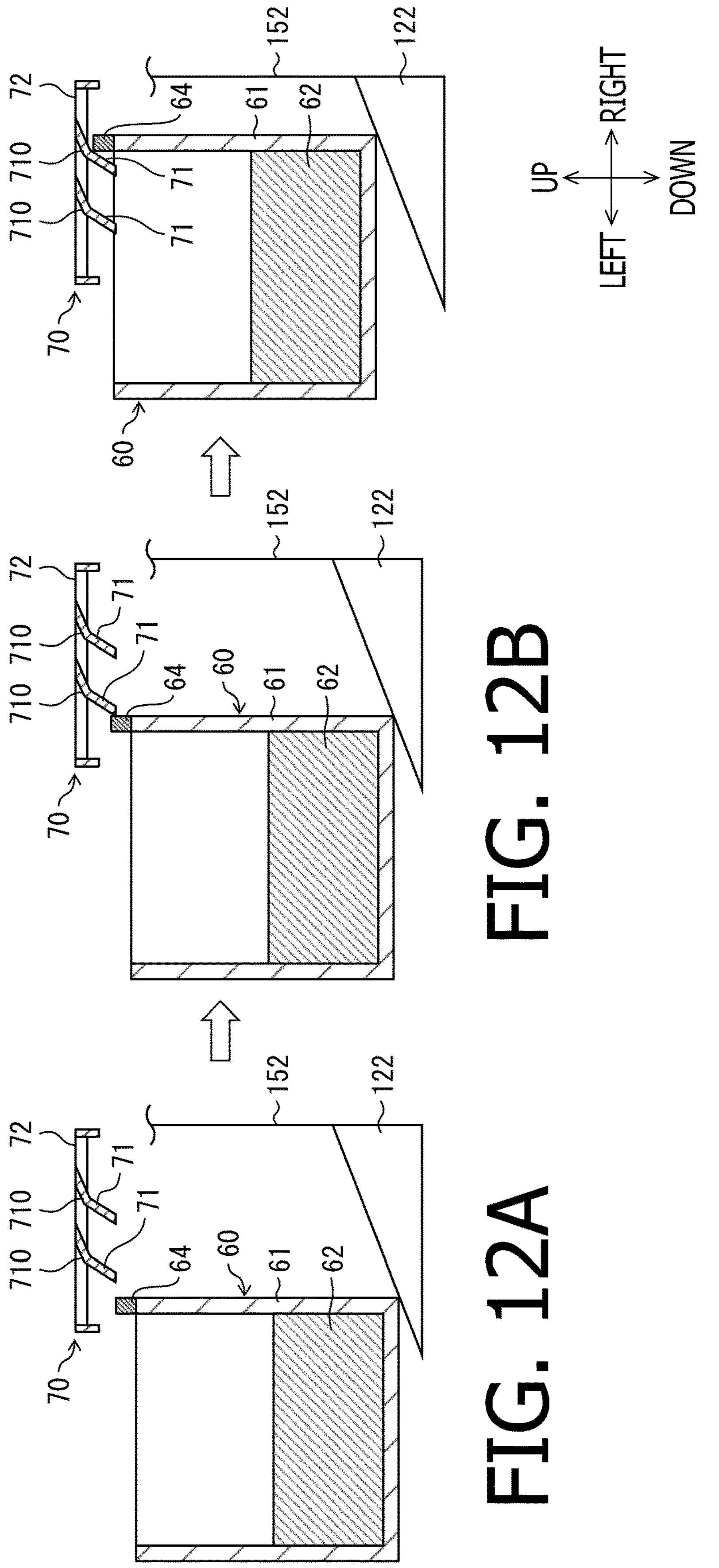

FIG. 12A illustrates a waste liquid tank being mounted in a compartment. FIG. 12B illustrates the waste liquid tank being mounted further inward in the compartment. FIG. 12C illustrates the waste liquid tank being completely mounted in the compartment.

Figure 13A:
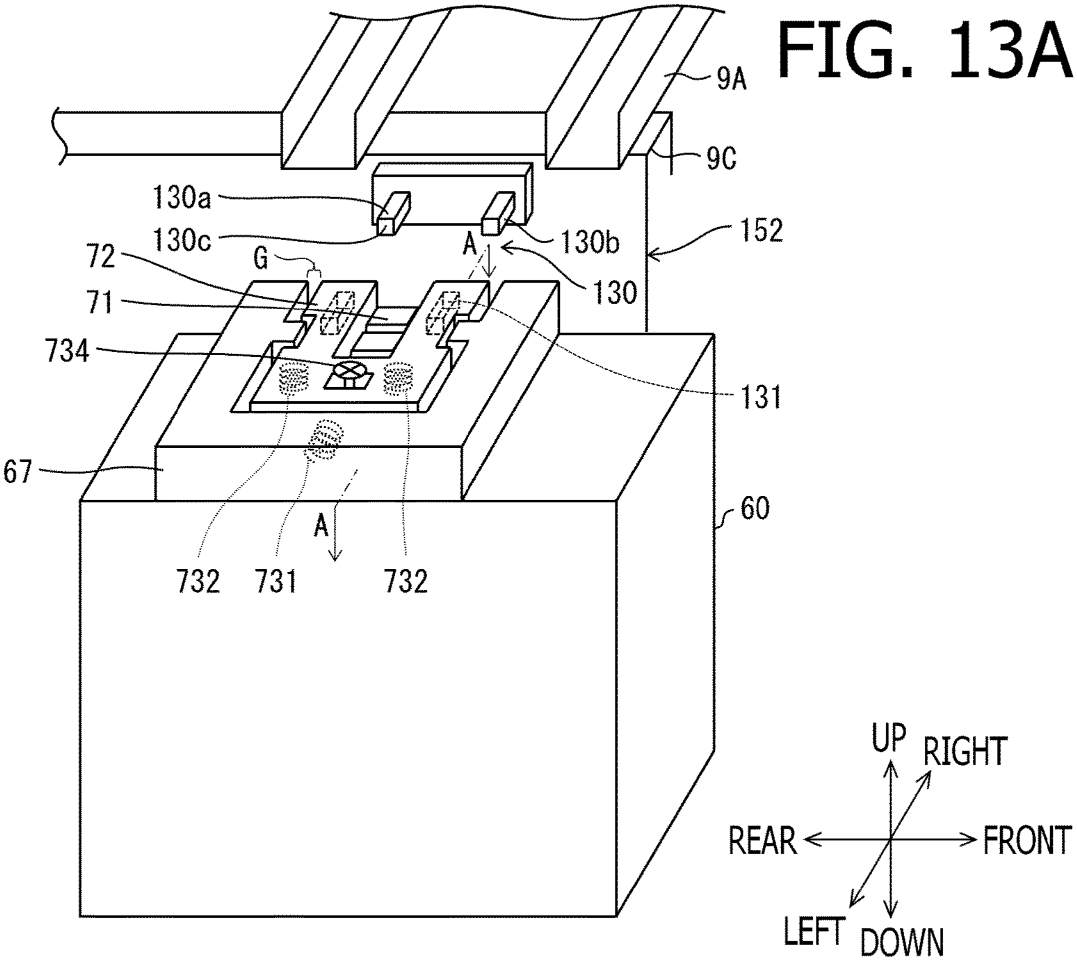
Figure 13B:
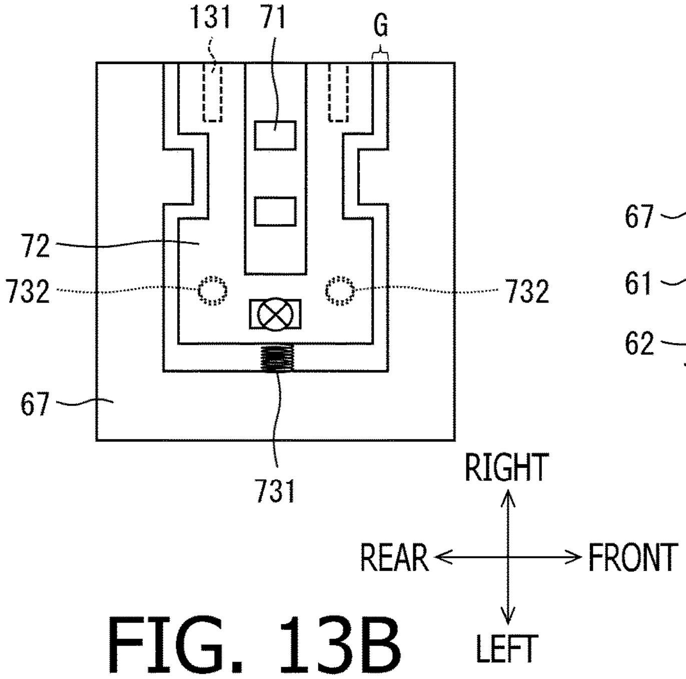
Figure 13C:
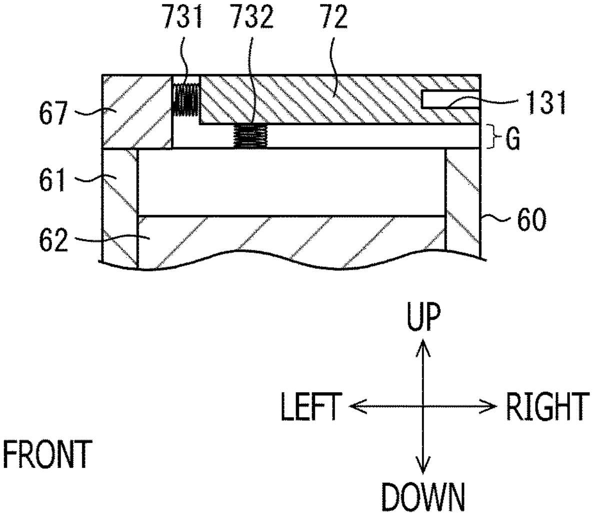

FIG. 13A is a perspective view of a compartment and a waste liquid tank viewed from left. FIG. 13B is a top plan view of the waste liquid tank. FIG. 13C is a cross-sectional partial view of the waste liquid tank sectioned at line A-A indicated in FIG. 13A.

Figure 14B:
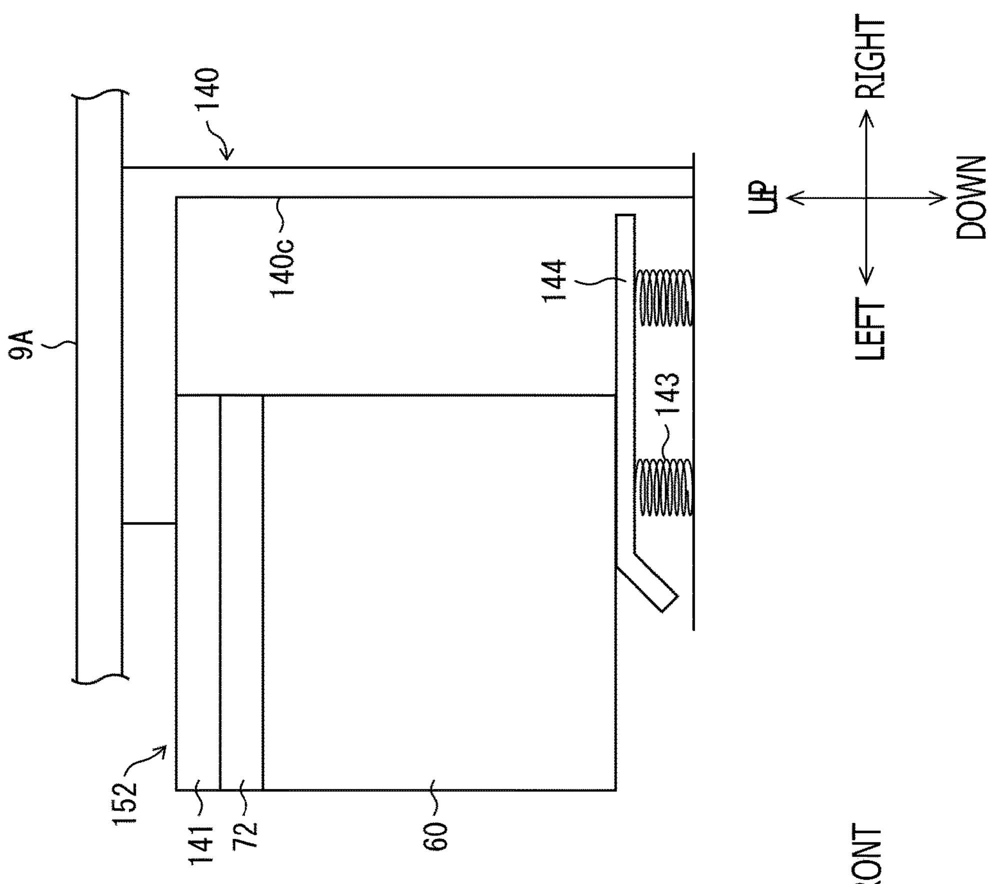
Figure 14A:
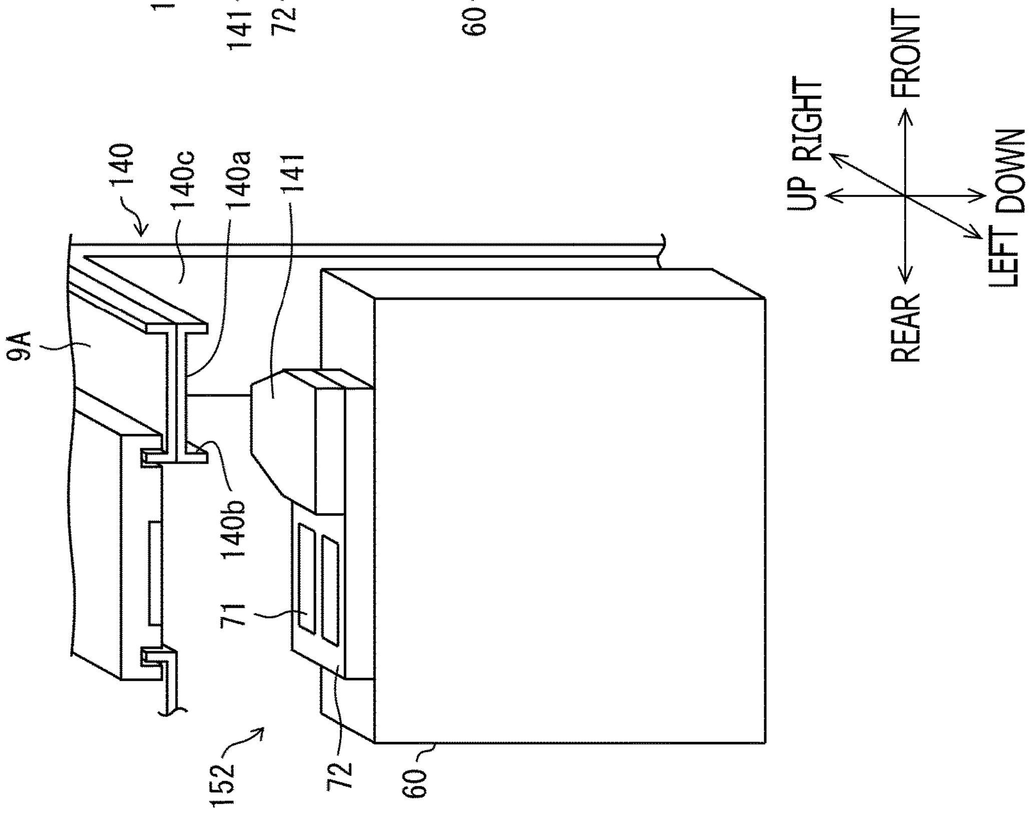

FIG. 14A is a perspective view of a compartment and a waste liquid tank viewed from left. FIG. 14B is a side view of the compartment viewed from front.

[Inkjet Printer 1]

<Overall Configuration>

Figure 1:
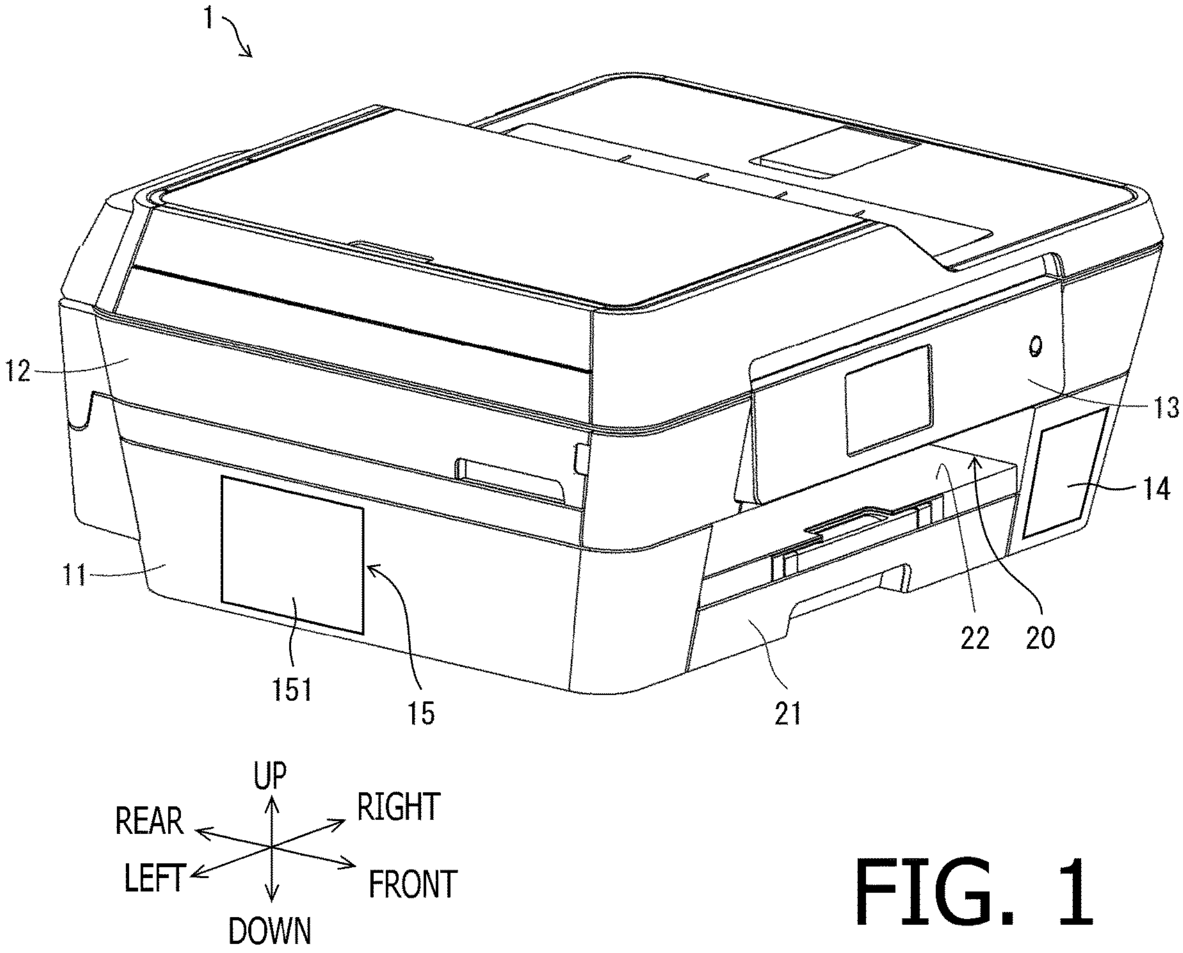
FIG. 1 is a perspective exterior view of an inkjet printer.
Figure 2:
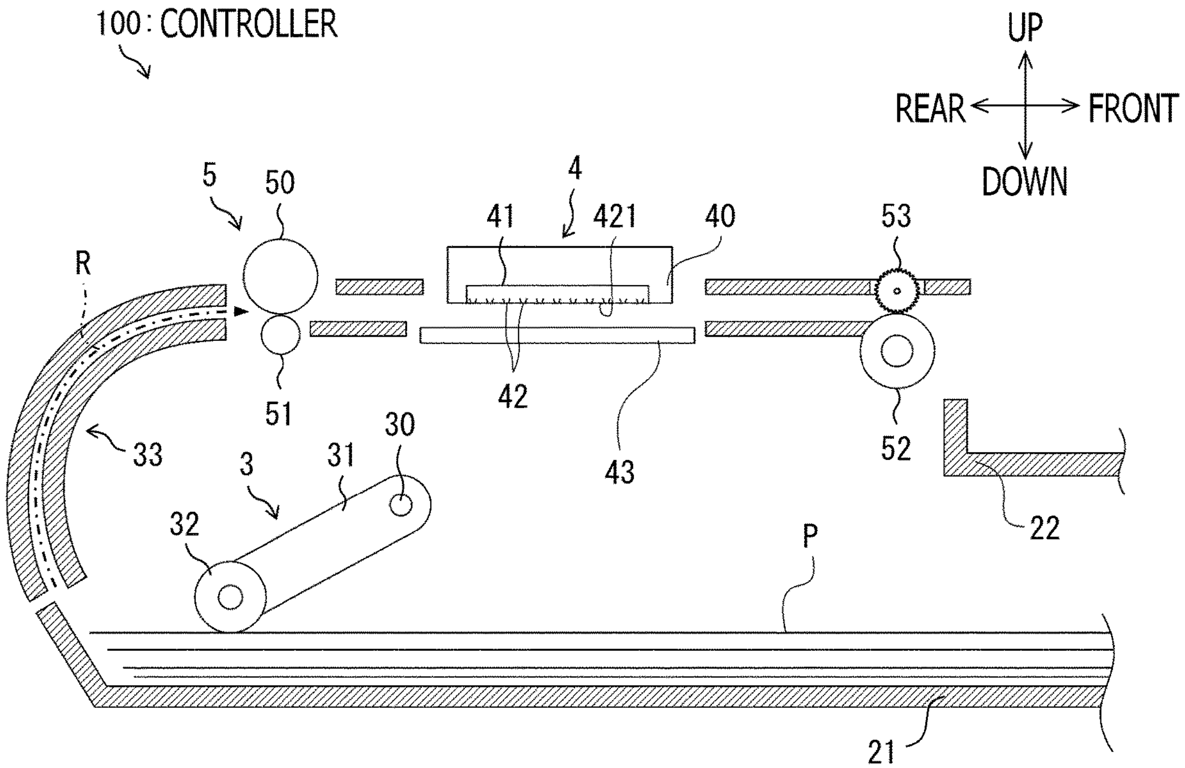
FIG. 2 is a cross-sectional view to illustrate an inner structure of the inkjet printer.
Figure 3:
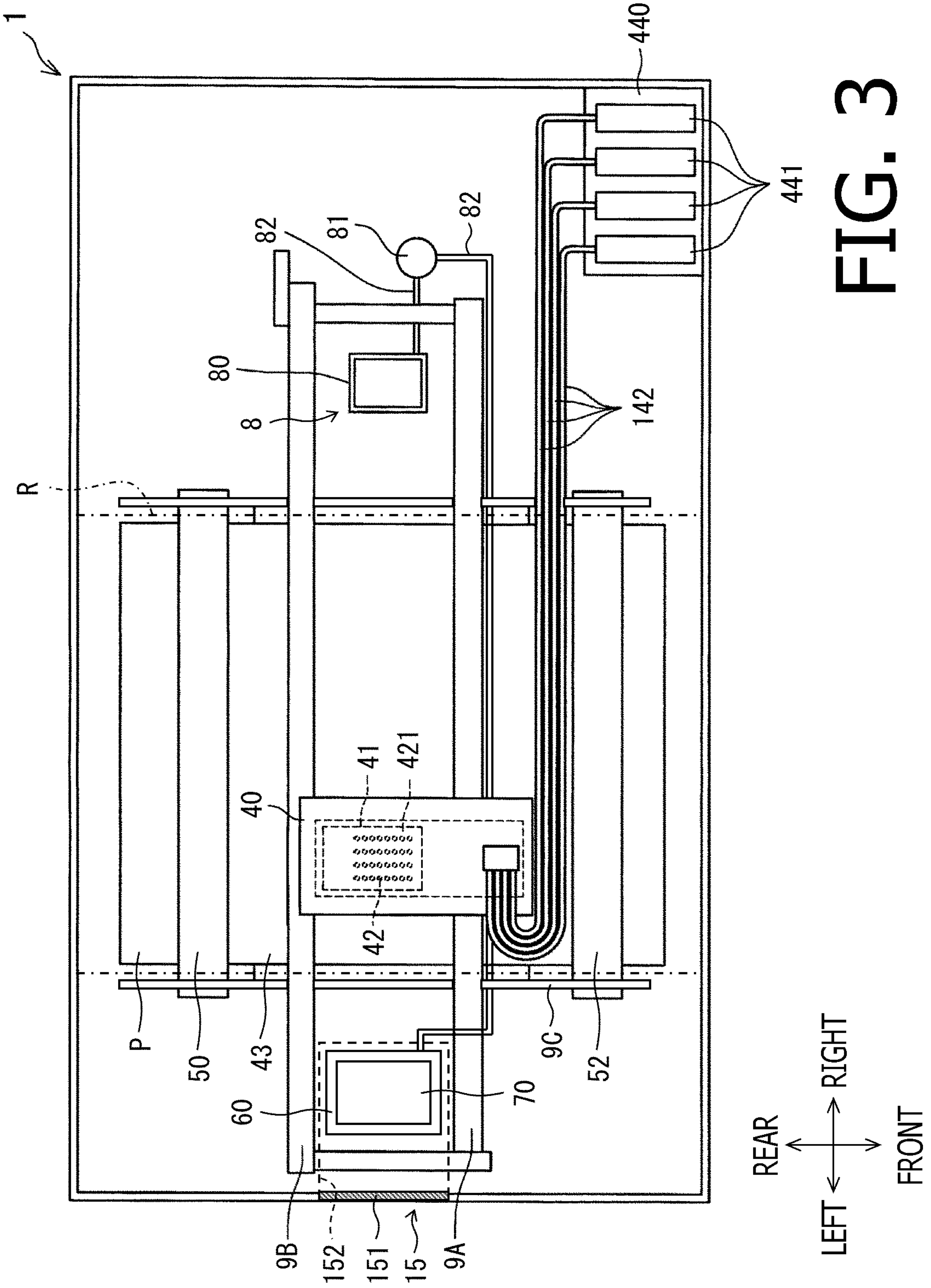
FIG. 3 is a cross-sectional view of the inkjet printer viewed from an upper side.

An overall configuration of an inkjet printer 1 will be described below with reference to FIGS. 1-3. FIG. 1 is a perspective exterior view of the inkjet printer 1. FIG. 2 is a cross-sectional view to illustrate an inner structure of the inkjet printer 1. FIG. 3 is a cross-sectional view of the inkjet printer 1 viewed from an upper side.

The inkjet printer 1 shown in FIG. 1 may discharge liquid. In the following description, directions in the inkjet printer 1 are defined with reference to an orientation of the inkjet printer 1 in a usable condition set on a base plane as shown in FIG. 1: a vertical direction as indicated by upward and downward arrows in FIG. 1 includes up-to-down and down-to-up directions, whereas a side toward the base plane is defined as a lower side. A front-rear direction as indicated by arrows pointing lower-rightward and upper-rearward in FIG. 1 includes front-to-rear and rear-to-front directions, whereas a side on which an opening 20 is located is defined as a front side. A left-right direction, or a widthwise direction, as indicated by arrows pointing lower-leftward and upper-rightward in FIG. 1 includes leftward and rightward directions, whereas a lefthand side to a user who faces a face on the front side of the inkjet printer 1 is defined as a leftward side. The widthwise direction may also be called a scanning direction, in which a carriage 40 (see FIG. 2) is movable. The carriage 40 will be described further below.

As shown in FIG. 1, the inkjet printer 1 includes a main housing 11 and a scanner housing 12 stacked on an upper side in the inkjet printer 1. The main housing 11 and the scanner housing 12 together form a substantially rectangular boxed shape.

On a front side of the main housing 11, an operation panel 13, a cartridge cover 14, and a tank exchangeable unit 15 are arranged. The operation panel 13 includes operation devices, such as operation buttons, and a liquid crystal display. The cartridge cover 14 is pivotable with respect to the main housing 11. Inside the cartridge cover 14, as shown in FIG. 3, ink cartridges 441 are arranged and attached to a cartridge case 440. Moreover, as shown in FIG. 1, on the front side of the main housing 11, the opening 20 is formed. Through the opening 20 formed on the front side of the main housing 11, a feeder tray 21 and an ejection tray 22 may be attached to or detached from the inkjet printer 1. The scanner housing 12 accommodates a scanner (not shown), which may read an image appearing on a sheet P.

The tank exchangeable unit 15 is located on a sideward face on a widthwise end of the main housing 11. For example, the tank exchangeable unit 15 may be located on a leftward face of the main housing 11. The tank exchangeable unit 15 includes a cover 151, which is pivotable with respect to the main housing 11, and a compartment 152 (see FIG. 3), which is exposed when the cover 151 is open and may accommodate a waste liquid tank 60. In other words, the cover 151 being open allows the waste liquid tank 60 to be mounted in and demounted from the main housing 11.

The compartment 152 may have a form to fit with the waste liquid tank 60. The compartment 152 has a wall, on which a sideward face of the waste liquid tank 60 may abut, on an inner side in a mounting/demounting direction of the waste liquid tank 60. The wall may therefore restrict the waste liquid tank 60 from moving further inward.

The tank exchangeable unit 15 may not necessarily have the cover 151 being openable/closable. For example, a waste liquid tank unit, which consists of the waste liquid tank 60 and a tank retainer having the cover 151 to retain the waste liquid tank 60, may be mounted in and demounted from the main housing 11. In this arrangement, when the waste liquid tank unit is demounted from the main housing 11, an opening having a form that corresponds to a form of the waste liquid tank unit may be exposed; and when the waste liquid tank unit is mounted in the main housing 11, the cover 151 attached to the waste liquid tank unit may close the opening. Moreover, the tank exchangeable unit 15 may not necessarily be located on the side on the widthwise end of the main housing 11 but may be located on a side of the main housing 11 in the front-rear direction or in the vertical direction. In the following paragraphs, the direction, in which the waste liquid tank 60 may be mounted in or demounted from the main housing 11 may be called a mounting/demounting direction.

<Internal Configuration>

Next, an internal configuration of the inkjet printer 1 will be described with reference to FIG. 2.

As shown in FIG. 2, the inkjet printer 1 includes a feeder 3, a recorder 4, a conveyer 5, and a controller 100.

The feeder 3 includes a shaft 30, a feeder arm 31, and a feeder roller 32. The feeder 3 may feed sheets P stored in the feeder tray 21 to a conveyer path R by rotating the feeder roller 32. The feeder roller 32 is located at a tip end of the feeder arm 31 and is supported rotatably by the feeder arm 31. The feeder arm 31 is pivotably supported by the shaft 30, which is supported by a frame of the inkjet printer 1. The feeder arm 31 is urged toward the feeder tray 21 by weight thereof or by an urging force from, for example, a spring.

The conveyer path R extends upward from a rear end of the feeder tray 21, curving frontward in an area delimited by a guide member 33, to the ejection tray 22.

The feeder roller 32 may, when a feeder motor (not shown) is activated by the controller 100, pick up the sheets P from the feeder tray 21 one by one. The sheets P picked up from the feeder tray 21 may be conveyed along the conveyer path R and fed to the recorder 4.

The recorder 4 is located above the feeder 3. The recorder 4 includes a carriage 40, a recording head 41 for discharging liquid, a plurality of nozzles 42, and a platen 43. The carriage 40 is supported by guide rail 9A and a guide rail 9B, which extend in the widthwise direction. The guide rails 9A, 9B are supported by a frame 9C, which extends in the front-rear direction. The frame 9C, moreover, supports a conveyer roller 50 and an ejection roller 52, which will be described further below. The carriage 40 may, when a driving force from a carriage motor (not shown) is transmitted thereto, move back and forth in the scanning direction which is the widthwise direction, i.e., a direction of width of the sheet P being conveyed. For recording an image on the sheet P, the controller 100 of the inkjet printer 1 may repeat a recording process, in which the controller 100 operates the carriage 40 to move in the widthwise direction and the recording head 41 to discharge ink through the nozzles 42 while the sheet P stays still, and a conveying process, in which the controller 100 drives the conveyer roller 50 and the ejection roller 52 to convey the sheet P by a predetermined linefeed amount, alternately.

On the carriage 40, the recording head 41 is mounted. The plurality of nozzles 42 are formed on a lower face of the recording head 41. The plurality of nozzles 42 are arrayed in lines along the front-rear direction to form nozzle lines, and four (4) nozzle lines are formed on a nozzle surface 421 to align in the widthwise direction. The nozzles 42 forming a first one of the nozzle lines, a second one of the nozzle lines, a third one of the nozzle lines, and a fourth one of the nozzle lines from right to left, may discharge inks in colors of black, yellow, cyan, and magenta, respectively. However, the aligning order of the nozzle lines may not necessarily be limited but may be changed optionally.

The recording head 41 may discharge ink droplets through the nozzles 42 by causing vibrating elements such as piezo elements to vibrate.

The platen 43 is located below the recording head 41 and extends throughout or over the entire length of the sheet P in the widthwise direction. The platen 43 may support the sheet P from below during the recording process. While the carriage 40 moves in the widthwise direction over the sheet P supported by the platen 43, the recording head 41 may discharge the ink droplets selectively from the nozzles 42 to record the image on the sheet P.

The conveyer 5 includes the conveyer roller 50 and the ejection roller 52, which are located on one side and the other side, respectively, of the carriage 40 and the platen 43 in the front-rear direction. At a position below the conveyer roller 50, a pinch roller 51 is arranged to face the conveyer roller 50. The conveyer roller 50 may be driven by a conveyer motor (not shown) to rotate. The pinch roller 51 may rotate along with the rotation of the conveyer roller 50. With the rotation of the conveyer roller 50 and the pinch roller 51, the sheet P nipped between the conveyer roller 50 and the pinch roller 51 may be conveyed along the conveyer path R to the recorder 4.

The ejection roller 52 is located on a downstream side of the conveyer roller 50 across the carriage 40 and the platen 43 in a conveying direction to convey the sheet P from the feeder tray 21 to the ejection tray 22. At a position above the ejection roller 52, a spur roller 53 is arranged to face the ejection roller 52. The ejection roller 52 may be driven by the conveyer motor (not shown) to rotate. The spur roller 53 may rotate along with the rotation of the ejection roller 52. With the rotation of the ejection roller 52 and the spur roller 53, the sheet P nipped between the ejection roller 52 and the spur roller 53 may be ejected from the conveyer path R to rest at the ejection tray 22.

The controller 100 includes a Central Processing Unit (CPU), a Read-Only Memory (ROM), a Random Access Memory (RAM), and Application Specific Integrated Circuit (ASIC) including a variety of controlling circuits. The controller 100 is connected with devices that compose the inkjet printer 1, including the recording head 41 and the conveyer motor of the conveyer 5. The controller 100 is, moreover, connected with the operation panel 13 and external devices such as a PC (not shown).

The controller 100 may run programs stored in the ROM to cause the CPU and the ASIC to execute processes to control acts of the devices, including the recording head 41 and a maintenance unit 8, such as a flushing action to discharge ink droplets from the nozzles 42. The controller 100 may control the recording head 41 and the conveyer motor according to a printing command transmitted from the external device such as the PC and execute a printing process to print the image on the sheet P. The maintenance unit 8 and the flushing action will be described further below. It may be noted that the controller 100 may not necessarily consist of the CPU, the ROM, the RAM, and the ASIC alone but may consist of any hardware devices.

The inkjet printer 1 in the configuration as described above may operate the conveyer 5 to convey the sheet P in the conveying direction, move the carriage 40 along with the recording head 41 in the scanning direction, and operate the recording head 41 to discharge the ink to print an image on the sheet P.

<Cartridge Case 440>

Next, the cartridge case 440 will be described with reference to FIG. 3. As shown in FIG. 3, the cartridge case 440 may contain four (4) ink cartridges 441 aligning in the widthwise direction. The ink cartridges 441 are removable from the cartridge case 440 and may contain inks in the colors of black, yellow, cyan, and magenta. The inks contained in the ink cartridges 441 may be supplied to the recording head 41 through tubes 142.

<Maintenance Unit 8>

Next, the maintenance unit 8 will be described with reference to FIG. 3. As shown in FIG. 3, the inkjet printer 1 has the maintenance unit 8. The maintenance unit 8 includes a cap 80, a pump 81, and a tube 82. The maintenance unit 8 is located at a position lower than a scanning path of the carriage 40 and on an outer side from the platen 43 in the scanning direction. In the present embodiment, the maintenance unit 8 is located rightward with respect to the platen 43. However, the maintenance unit 8 may optionally be located leftward with respect to the platen 43. When the maintenance unit 8 is located leftward with respect to the platen 43, a waste liquid tank 60 and a flushing unit 70 may be located rightward with respect to the platen 43.

The cap 80 is formed of rubber. The cap 80 is located at a position lower than the recording head 41 and on an outer side from the platen 43 in the scanning direction. When the carriage 40 is located at a maintenance position, which is on an outer side from the platen 43 in the scanning direction, the cap 80 faces the nozzle surface 421 of the recording head 41.

The cap 80 is movable in the vertical direction by, for example, a lifting device (not shown). The cap 80 located at the maintenance position may move upward to fit with the nozzle surface 421. The cap 80 fitting with the nozzle surface 421 may cover the recording head 41 to receive the inks discharged from the recording head 41 and prevent the nozzle surface 421 from drying.

The pump 81 may be driven by a motor (not shown) to suction the inks in the nozzles 42 through the cap 80 and the tube 82 and eject the suctioned inks through the tube 82 at the waste liquid tank 60.

The tube 82 forms a flow path, in which the inks ejected from the maintenance unit 8 may be transported to the waste liquid tank 60. The tube 82 is made of a flexible material. The inks may be transported from the cap 80 through the pump 81 to the waste liquid tank 60.

The maintenance unit 8 in the configuration as described above may perform maintenance actions on the recording head 41. In particular, the maintenance unit 8 may perform a purging action to suction the inks and the air in the nozzles 42 and dust adhered to the nozzles 42 as a maintenance act. In the following paragraphs, the term "inks" may include the inks and the air in the nozzles 42 and the dust adhered to the nozzles 42. Thus, the maintenance unit 8 may remove the inks from the nozzles 42 by suctioning with the pump 81. The inks removed from the recording head 41 by the maintenance unit 8 may be stored in the waste liquid tank 60.

<Waste Liquid Tank 60>

Figure 4:
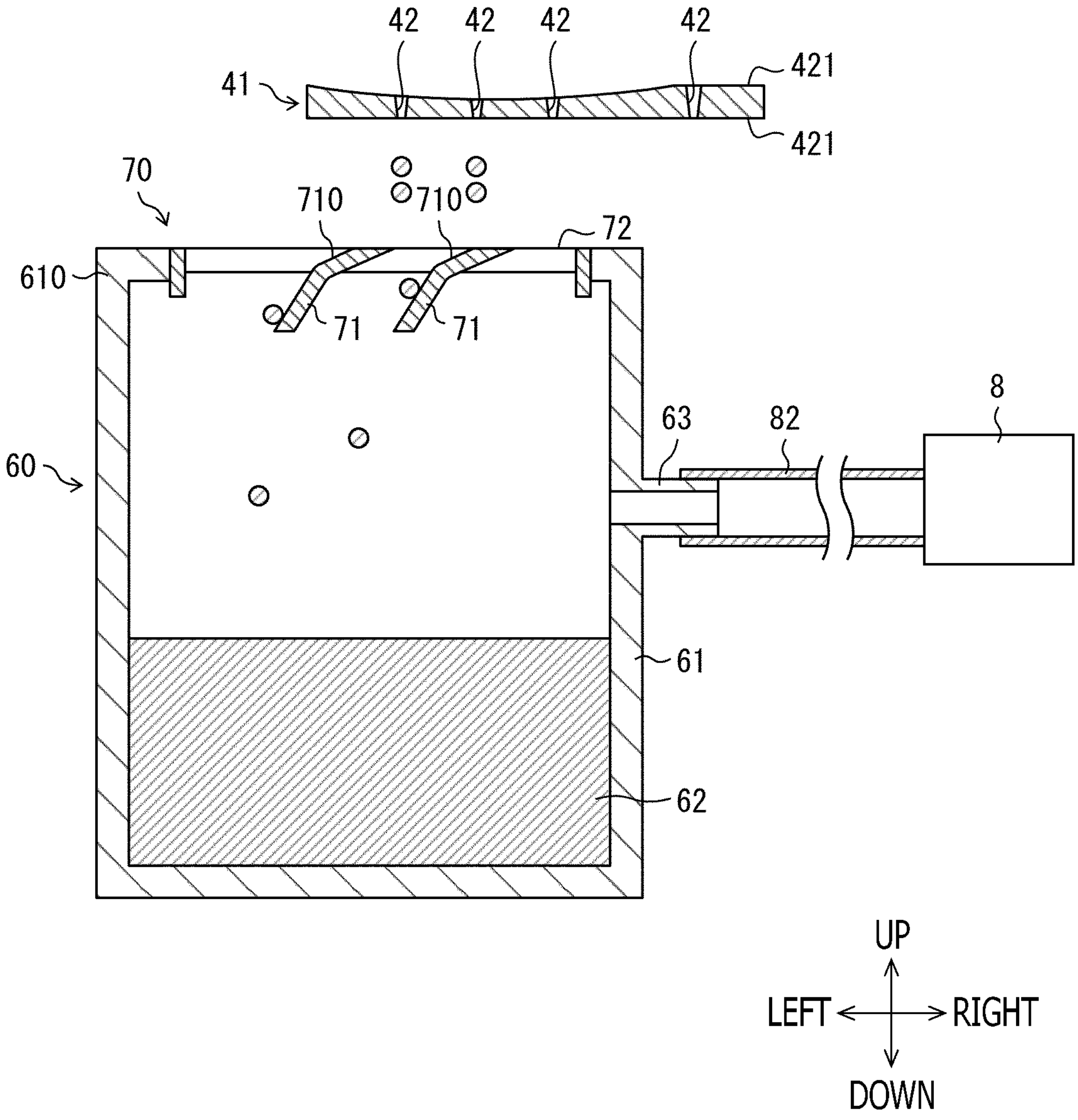
FIG. 4 illustrates arrangement of a waste liquid guide and a waste liquid tank.

Next, the waste liquid tank 60 will be described with reference to FIGS. 3-4. FIG. 4 illustrates arrangement of a waste liquid guide 71 and the waste liquid tank 60.

As shown in FIG. 3, the inkjet printer 1 has the waste liquid tank 60. The waste liquid tank 60 may receive the inks discharged from the recording head 41 at an opening thereof and store the received inks therein. The waste liquid tank 60 is located at a position different from the cap 80 of the maintenance unit 8. The waste liquid tank 60 may be mounted in and demounted from the main housing 11 when the cover 151 is open. The waste liquid tank 60 has, as shown in FIG. 4, a waste liquid case 61, an ink absorber foam 62, and a port 63.

The waste liquid case 61 may be made of, for example, synthetic resin. The waste liquid case 61 has an opening at an upper side thereof and has a substantially rectangular boxed shape in a top plan view. In other words, the waste liquid case 61 has a bottom surface and side surfaces rising upright from edges of the bottom surface. The ink absorber foam 62 is arranged inside the waste liquid case 61. The waste liquid case 61 may optionally have a handle to be gripped by a user when the waste liquid tank 60 is mounted in or demounted from the main housing 11. The handle may be arranged on one of side surfaces of the waste liquid case 61 on a side closer to the user when the user mounts or demounts the waste liquid tank 60 in or from the main housing 11. For example, if the mounting/demounting direction coincides with the widthwise direction, frontward and rearward surfaces of the waste liquid case 61 may have guides for guiding the waste liquid tank 60 inward in the compartment 152. In this arrangement, the compartment 152 may have guide receivers that may receive the guides. Moreover, the waste liquid case 61 may have a form that causes the user to feel clicking when the waste liquid tank 60 reaches a predetermined position in the compartment 152. In this arrangement, the compartment 152 may have a form to cause the clicking feeling in conjunction with the waste liquid case 61.

The ink absorber foam 62 may be made of, for example, unwoven fabric, sponge, or cotton that may absorb the inks. The ink absorber foam 62 is arranged inside the waste liquid case 61. Thus, the waste liquid case 61 may contain the inks discharged from the recording head 41, and the ink absorber foam 62 may absorb the inks in the waste liquid case 61.

The port 63 connects the waste liquid case 61 to the tube 82. The waste liquid tank 60 is connected to one end of the tube 82 through the port 63. The port 63 is formed of a part of the waste liquid case 61 protruding rightward from the rightward side surface of the waste liquid case 61. The port 63 is located in a substantially vertically central area on the rightward side surface. The port 63 forms a communication channel to connect the inside and the outside of the waste liquid case 61. The port 63 is in a form, to which the tube 82 is connectable. The tube 82 connected to the port 63 therefore connects the waste liquid tank 60 and the maintenance unit 8, and the inks ejected from the maintenance unit 8 may be stored in the waste liquid tank 60. The inks transported from the cap 80 through the tube 82 to the waste liquid tank 60 may be stored in the waste liquid tank 60. It may be noted that the port 63 may not necessarily be located on the rightward side surface of the waste liquid case 61 but may optionally be located on, for example, a frontward side surface, or a leftward side surface, as long as the port 63 is located on any one of the side surfaces of the waste liquid case 61.

<Flushing Unit 70>

The flushing unit 70 has, as shown in FIG. 4, the waste liquid guide 71 and a guide retainer frame 72, to which the waste liquid guide 71 is fixed. The flushing unit 70 may prevent the inks discharged from the nozzles 42 from scattering in mist during a flushing process and guide the inks to the waste liquid tank 60. The waste liquid guide 71 may include one or more pieces of waste liquid guide 71.

The flushing process is an action to operate the recording head 41 while the carriage 40 is located at a flushing position, where the carriage 40 faces the flushing unit 70, to discharge the inks through the nozzles 42 at the waste liquid guide 71, rather than at the sheet P.

For preventing the inks discharged in the flushing process from scattering in mist, the waste liquid guide 71 has a slant surface 710 extending in a direction to intersect with the vertical direction, which is a direction to discharge the inks from the nozzles 42. For example, the slant surface 710 may slant uphill toward the right.

As shown in FIG. 4, the waste liquid tank 60 is located at a position lower than the flushing unit 70. The waste liquid guide 71 is, in the vertical direction that intersects orthogonally with the nozzle surface 421 of the recording head 41, located between the recording head 41 and the waste liquid tank 60. Therefore, the inks discharged from the recording head 41 in the flushing process may land on the slant surface 710 of the waste liquid guide 71 and may be guided along the slant surface 710 to the ink absorber foam 62 located inside the waste liquid tank 60. Thus, the waste liquid guide 71 may receive the inks discharged from the recording head 41.

The guide retainer frame 72 retains the waste liquid guide 71. The guide retainer frame 72 is a frame, to which the waste liquid guide 71 is fixed, and has a substantially rectangular form in a top plan view. The waste liquid guide 71 is fixed to the waste liquid tank 60 by, for example, fastening the guide retainer frame 72 to a fastening portion 610 with screws. Optionally, the guide retainer frame 72 retaining the waste liquid guide 71 may be formed integrally with the side walls of the waste liquid case 61. Thus, the waste liquid tank 60 may consist of the waste liquid case 61 to store the inks discharged from the recording head 41 and the waste liquid guide 71 with the slant surface 710 for receiving the inks discharged from the recording head 41 and guiding the received inks to the waste liquid case 61. The waste liquid tank 60 is mountable in and demountable from the main housing 11 of the inkjet printer 1.

The guide retainer frame 72 may not necessarily be fixed to the leftward side of the waste liquid tank 60 but may be optionally fixed to the rightward side, the frontward side, or the rearward side of the waste liquid tank 60.

<Arrangement of Waste Liquid Tank 60 and Flushing Unit 70>

Arrangement of the waste liquid tank 60 and the flushing unit 70 will be described with reference to FIGS. 3-4. As shown in FIG. 3, the waste liquid tank 60 and the flushing unit 70 are located at positions on an outer side of the platen 43 in the scanning direction.

In particular, the waste liquid tank 60 and the flushing unit 70 are, as shown in FIG. 3, located at positions opposite to the maintenance unit 8 across the conveyer path R. In other words, the waste liquid tank 60 and the flushing unit 70 are located on one side of the conveyer path R opposite to the maintenance unit 8 in the widthwise direction. The waste liquid tank 60 is located outside the conveyer path R in the scanning direction of the recording head 41. The positions of the waste liquid tank 60, the conveyer path R, and the maintenance unit 8 are, in a plan view from an upper position with respect to the inkjet printer 1, as shown in FIG. 3, in an arrangement such that the maintenance unit 8, the conveyer path R, and the waste liquid tank 60 are arrayed side by side in the widthwise direction from right to left in this recited order. However, as long as the maintenance unit 8, the conveyer path R, and the waste liquid tank 60 are arrayed side by side in the widthwise direction, the maintenance unit 8, the conveyer path R, and the waste liquid tank 60 may not necessarily align at a same height in the vertical direction. In other words, for example, the maintenance unit 8 may be located to be lower than the conveyer path R while the waste liquid tank 60 may be located to be higher than the conveyer path R in the inkjet printer 1.

In the present embodiment, while the maintenance unit 8 is located on the rightward side of the conveyer path R, the waste liquid tank 60 and the flushing unit 70 are located on the leftward side opposite to the maintenance unit 8 across the conveyer path R. However, the arrangement of the waste liquid tank 60 and the flushing unit 70 may not necessarily be limited as long as the waste liquid tank 60 and the flushing unit 70 are located on one side of the conveyer path R and the maintenance unit 8 is located on the other side of the conveyer path R. In the arrangement of the waste liquid tank 60 and the maintenance unit 8 located on the opposite sides across the conveyer path R, the tube 82 traverses the conveyer path R to connect the waste liquid tank 60 and the maintenance unit 8, as shown in FIG. 3.

Meanwhile, as shown in FIG. 4, the waste liquid tank 60 and the flushing unit 70 are located to be lower than the recording head 41. Moreover, the waste liquid tank 60 is located at a position, at which the waste liquid tank 60 overlaps the nozzle surface 421 of the recording head 41 at least partly in the vertical direction, i.e., in the direction intersecting orthogonally with the nozzle surface 421 of the recording head 41. In other words, in the condition where the carriage 40 is located at the flushing position, at least one of the four nozzles line aligning in the widthwise direction on the nozzle surface 421 is located to overlap the waste liquid tank 60 in the vertical direction. Moreover, for example, in the condition where the carriage 40 is located at the flushing position, the entire four nozzle lines aligning in the widthwise direction on the nozzle surface 421 may be located to overlap the waste liquid tank 60 in the vertical direction.

According to the present embodiment, the inks from the recording head 41 received by the cap 80 of the maintenance unit 8 is transported to the waste liquid tank 60. Meanwhile, optionally, the maintenance unit 8 may have a separate waste liquid tank. In other words, the inkjet printer 1 may have two (2) waste liquid tanks, one of which may be provided to the maintenance unit 8, and the other of which may be provided as the waste liquid tank 60. At least the other of the two waste liquid tanks being the waste liquid tank 60 is mountable to and demountable from the main housing 11.

<Benefits>

According to the configuration described above, the waste liquid tank 60 to store the inks discharged from the recording head 41 in the flushing process may be demountable from the main housing 11 and exchangeable with a new waste liquid tank 60. Therefore, the inkjet printer 1 is maintained usable even once the waste liquid tank 60 is filled with the waste inks discharged in the flushing process.

According to the configuration described above, the inks discharged from the recording head 41 in the flushing process may be collected in the waste liquid tank 60 through the waste liquid guide 71. Therefore, while the waste liquid tank 60 may be separated from the recording head 41, the inks discharged from the recording head 41 may be guided to the waste liquid tank 60 reliably and may be prevented from leaking outside the waste liquid tank 60.

According to the configuration described above, the waste liquid guide 71 is located between the recording head 41 and the waste liquid tank 60 in the vertical direction. In this arrangement, the inks discharged from the recording head 41 in the flushing process may flow on the waste liquid guide 71 to be collected in the waste liquid tank 60. Therefore, the inks discharged from the recording head 41 may be guided to the waste liquid tank 60 reliably and may be prevented from leaking outside the waste liquid tank 60.

According to the configuration described above, the waste liquid guide 71 is fixed to the waste liquid tank 60. In this arrangement, the waste liquid guide 71 may be mounted in or demounted from the main housing 11 together with the waste liquid tank 60 as the waste liquid tank 60 is mounted in or demounted from the main housing 11. Therefore, when the waste liquid tank 60 is mounted in or demounted from the main housing 11, the inks dripping from the waste liquid guide 71 may be prevented from falling outside the waste liquid tank 60.

According to the configuration described above, the waste liquid tank 60 is located to be lower than the flushing unit 70. In this arrangement, the inks discharged from the recording head 41 may be collected in the waste liquid tank 60 naturally. Therefore, the inks discharged from the recording head 41 may be prevented from falling outside the waste liquid tank 60.

According to the configuration described above, at least a part of the nozzle surface 421 of the recording head 41 is located to overlap the waste liquid tank 60. In this arrangement, even without the waste liquid guide 71, the inks discharged from the recording head 41 may be collected in the waste liquid tank 60 naturally, and the inks discharged from the recording head 41 may be prevented from falling outside the waste liquid tank 60. On the other hand, with the waste liquid guide 71, in the arrangement where the nozzle surface 421 overlapping the waste liquid tank 60 at least partly, the waste liquid guide 71 may not necessarily be lengthened but may be shortened.

According to the configuration described above, the waste liquid tank 60 is located outside the conveyer path R in the scanning direction of the recording head 41; therefore, the waste liquid tank 60 may not interfere with the sheet P being conveyed.

According to the configuration described above, the waste liquid tank 60 is located on the opposite side to the cap 80 across the conveyer path R. In this arrangement, the waste liquid tank 60 may be located in a space on the opposite side to the cap 80 in the inkjet printer 1. Therefore, the space inside the inkjet printer 1 may be used more effectively compared to a conventional arrangement, in which the cap and the waste liquid tank are located on the same side in the inkjet printer.

According to the configuration described above, the waste liquid tank 60 and the cap 80 are connected through the tube 82. With the tube 82, the inks from the recording head 41 received by the cap 80 may be collected in the waste liquid tank 60. Moreover, with the tube 82 connected to the waste liquid tank 60, the inks transported through the tube 82 may be prevented from leaking outside the waste liquid tank 60.

According to the configuration described above, the waste liquid tank 60 mountable in and demountable from the main housing 11 of the inkjet printer 1 is provided. Therefore, the waste liquid tank 60 containing the inks discharged in the flushing process from the recording head 41 may be exchanged with a new waste liquid tank 60, and the inkjet printer 1 may be maintained usable. Moreover, the inks discharged from the recording head 41 may be collected in the waste liquid case 61 through the waste liquid guide 71. Therefore, the inks discharged from the recording head 41 may be guided to the waste liquid case 61 and prevented from leaking outside the waste liquid case 61.

While the invention has been described in conjunction with the example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

First Modified Example

For example, the waste liquid guide 71 in the flushing unit 70 may not necessarily be fixed to the waste liquid tank 60.

Figure 5:
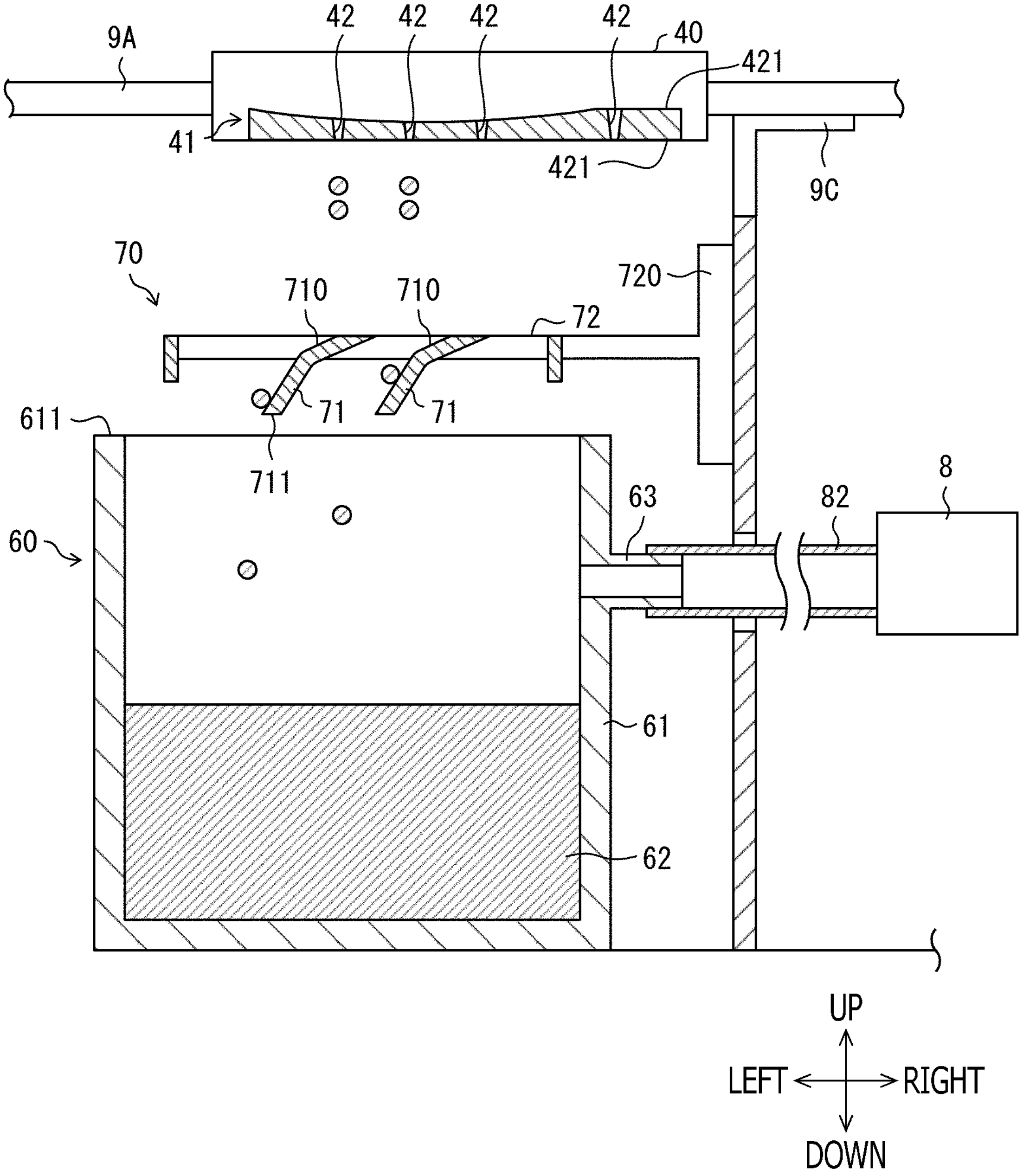
FIG. 5 illustrates a position where a waste liquid guide is fixed in the inkjet printer.

A first modified example, in which the position to fix the waste liquid guide 71 is modified, will be described below with reference to FIG. 5. FIG. 5 illustrates a modified position to fix the waste liquid tank 60 in the inkjet printer 1.

As shown in FIG. 5, the waste liquid guide 71 may be fixed to a structural component in the main housing 11. For example, the guide retainer frame 72 may be fixed to the frame 9C in the main housing 11 through a retainer portion 720. The retainer portion 720 may be fixed to the main housing 11 by, for example fastening to the frame 9C with screws. The frame 9C supports the guide rail 9A that supports the carriage 40. Therefore, with the waste liquid guide 71 being fixed to the frame 9C, the waste liquid guide 71 may be located at a correct position with respect to the recording head 41 mounted on the carriage 40. However, the structural component of the main housing 11 to which the waste liquid guide 71 is fixed may not necessarily be limited to the frame 9C, but the waste liquid guide 71 may be fixed to a different part of the main housing 11, such as, for example, a wall that forms the compartment 152.

In other words, according to the first modified example, a user's work to locate the waste liquid guide 71 with respect to the recording head 41 is not necessary while leakage of the inks discharged from the recording head 41 outside the waste liquid tank 60 due to deviation of the waste liquid guide 71 from the recording head 41 may be prevented. Moreover, with the waste liquid guide 71 fixed to the frame 9C in the main housing 11, a user's work to exchange the waste liquid guide 71 is not necessary when the waste liquid tank 60 is exchanged with a new waste liquid tank 60. Therefore, an amount of materials to be consumed may be reduced, and manufacturing cost of the inkjet printer 1 may be lowered.

Moreover, when the waste liquid guide 71 is fixed to the frame 9C in the main housing 11, a lower end 711 of the waste liquid guide 71 may be located to be higher than an edge 611 of the waste liquid tank 60 facing the nozzle surface 421 of the recording head 41. In other words, the lower end 711 of the waste liquid guide 71 and the edge 611 of the waste liquid tank 60 may be separated by a gap. In this arrangement, when the waste liquid tank 60 is mounted in or demounted from the main housing 11, the waste liquid tank 60 may not contact the waste liquid guide 71. Therefore, the waste liquid guide 71 may not interfere with the waste liquid tank 60 being mounted in or demounted from the main housing 11, and the waste liquid tank 60 may be mounted in or demounted from the main housing 11 easily.

Second Modified Example

For another example, the waste liquid tank 60 may not necessarily be located entirely below the flushing unit 70.

Figure 6:
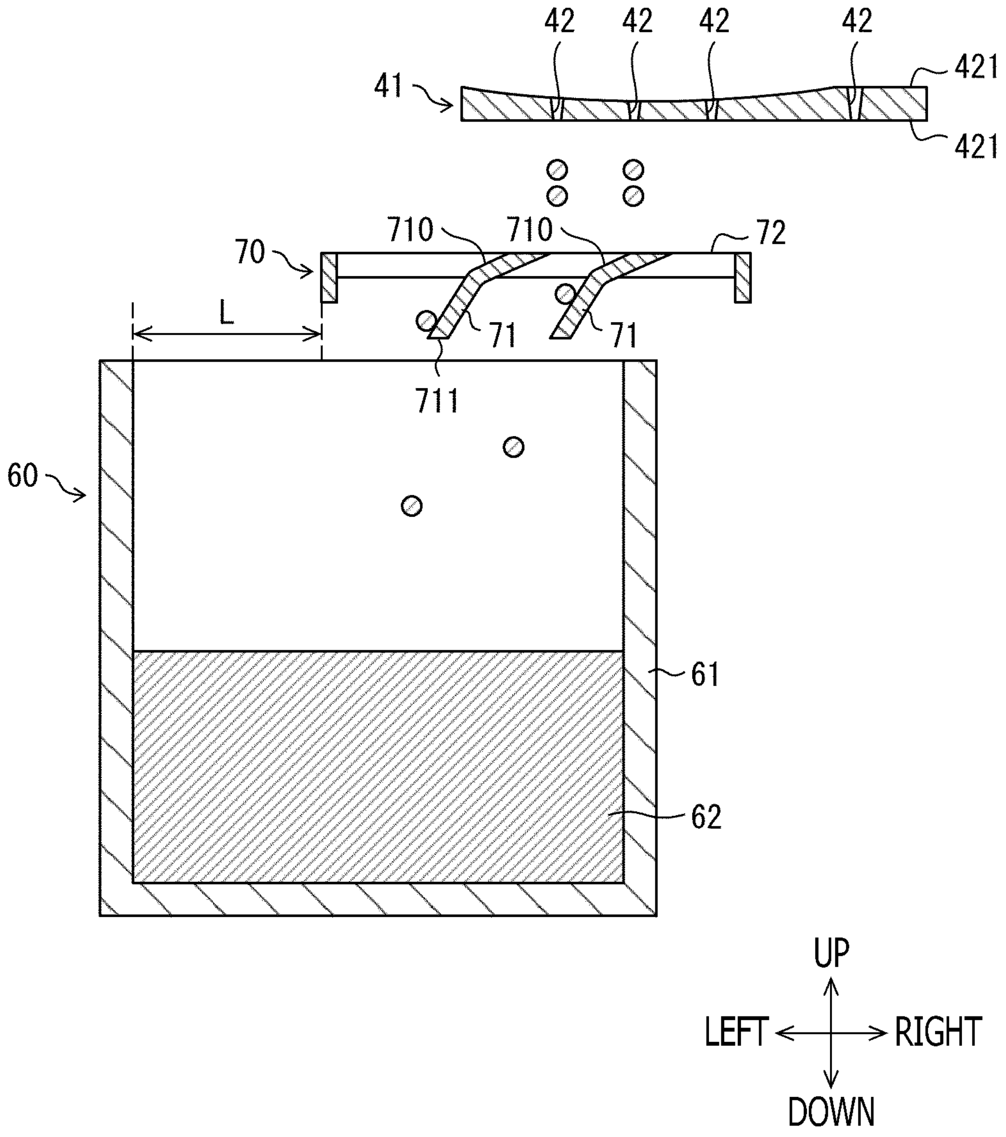
FIG. 6 illustrates arrangement of a waste liquid guide and a waste liquid tank.

A second modified example, in which the positional relation between the waste liquid tank 60 and the flushing unit 70 is modified, will be described below with reference to FIG. 6. FIG. 6 illustrates modified arrangement of the waste liquid guide 71 and the waste liquid tank 60. The waste liquid guide 71 as shown in FIG. 6 is fixed to the main housing 11.

As shown in FIG. 6, the waste liquid guide 71 in the flushing unit 70 may be located at a position, in which the waste liquid guide 71 at least partly overlaps the waste liquid tank 60 in the direction intersecting orthogonally with the nozzle surface 421, i.e., in the vertical direction. In particular, a lower end 711 of the waste liquid guide 71 may be located at a position on an inner side from the side face of the waste liquid case 61. In FIG. 6, the waste liquid guide 71 may include two (2) pieces of waste liquid guide 71, and the lower end 711 of one of the pieces of waste liquid guide 71 on the right is located on the inner side of the waste liquid case 61.

According to the second modified example, while the waste liquid guide 71 may be located closer to the waste liquid tank 60 and the length of the waste liquid guides 71 may be shorter, the inks discharged from the recording head 41 flowing on the waste liquid guide 71 may be guided in the waste liquid tank 60 and may be prevented from leaking outside the waste liquid tank 60. Moreover, demounting the waste liquid tank 60 from the main housing 11 may cause the lower end 711 of the waste liquid guide 71 to contact a contact portion 64 (see FIG. 7B) located on an upper edge of the waste liquid tank 60, and the inks adhered to the lower end 711 of the waste liquid guide 71 may be removed from the waste liquid guide 71 by the contact portion 64. Accordingly, after the waste liquid tank 60 is demounted from the main housing 11, the inks on the waste liquid guide 71 may be restrained from dripping to stain inside the main housing 11.

Moreover, according to the second modified example, the flushing unit 70 may be located further leftward, i.e., inward, in the main housing 11. Therefore, for example, a distance in the scanning direction for the carriage 40 to run for the flushing process may be shortened. When the running distance is shortened, for example, the dimension of the waste liquid tank 60 in the widthwise direction may be shortened by a length L shown in FIG. 6. Accordingly, the inkjet printer 1 may be downsized.

Third Modified Example

Figure 7B:
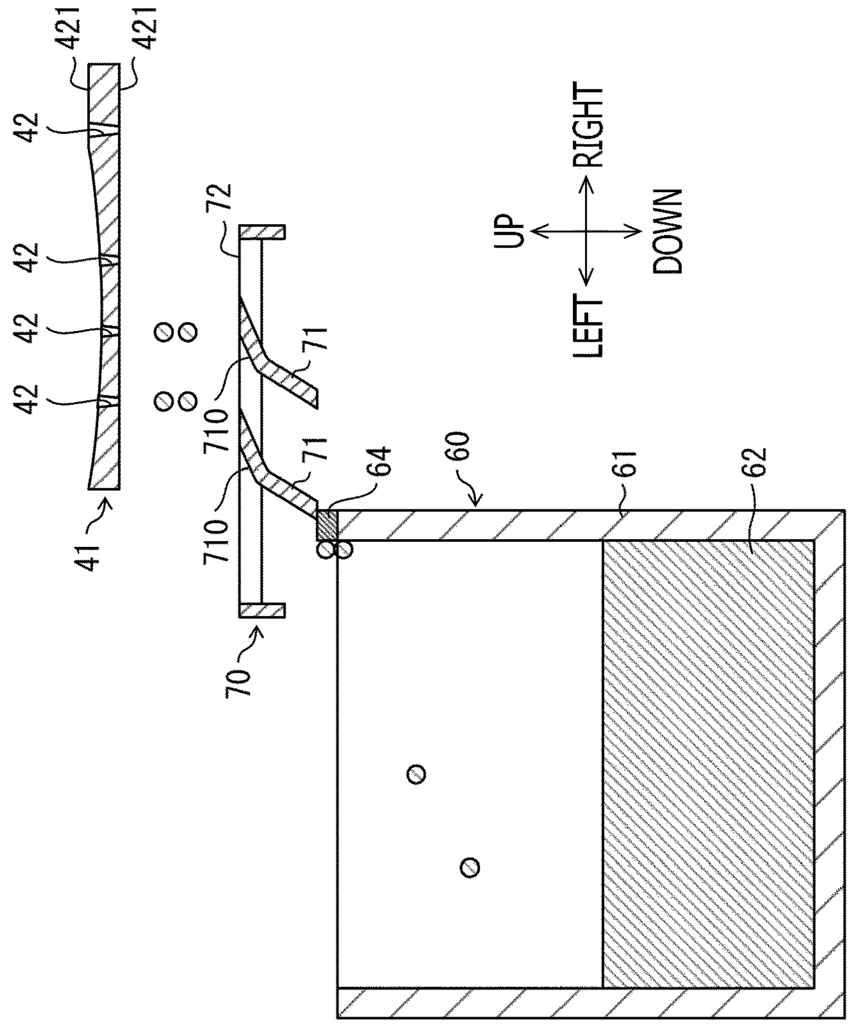
FIG. 7B illustrates the waste liquid tank drawn outward from the compartment.
Figure 7A:
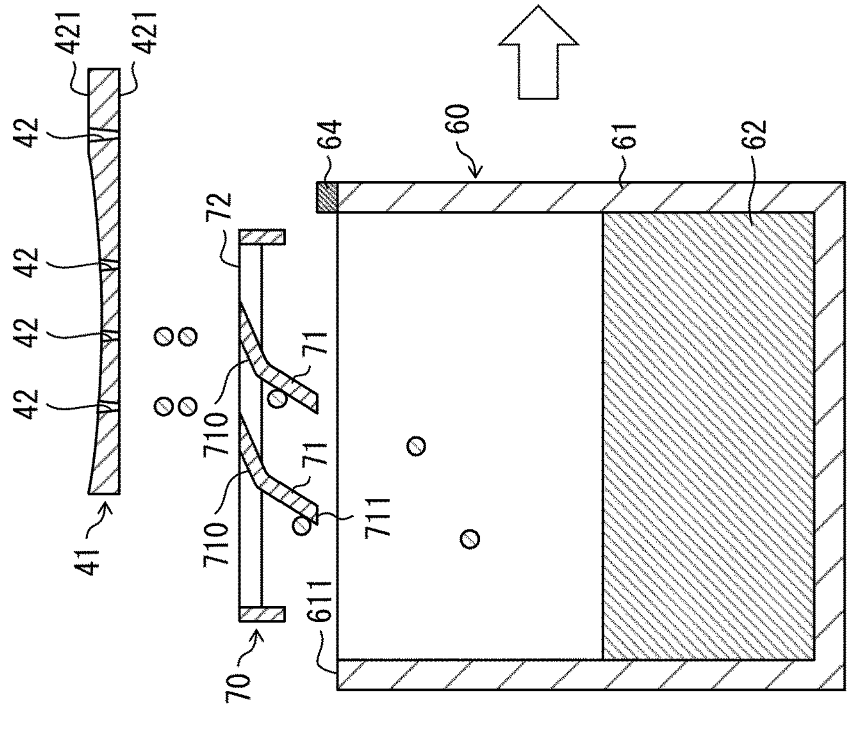
FIG. 7A illustrates a waste liquid tank mounted in a compartment.

A third modified example will be described below with reference to FIGS. 7A-7B. FIG. 7A illustrates a modified example of the waste liquid tank 60 mounted in the main housing 11. FIG. 7B illustrates the waste liquid tank 60 being drawn outward from the main housing 11. The waste liquid guide 71 in the third modified example is, as shown in FIGS. 7A-7B, fixed to the main housing 11.

As shown in FIGS. 7A-7B, the waste liquid tank 60 may have the contact portion 64, which may contact the lower end 711 of the waste liquid guide 71, on the edge facing the nozzle surface 421.

In particular, the contact portion 64 may be located on an upper edge 611 of one of the side faces of the waste liquid case 61 located on the inner side in the mounting/demounting direction of the waste liquid tank 60. The contact portion 64 may consist of, for example, unwoven fabric, sponge, or cotton that may absorb the inks.

According to the third modified example, the waste liquid case 61 has the contact portion 64, which may contact the lower end 711 of the waste liquid guide 71, on the edge 611 being the upper edge of the waste liquid case 61. Therefore, for example, as shown in FIG. 7B, when the waste liquid tank 60 is demounted from the main housing 11, the waste liquid remaining on the lower end 711 of the waste liquid guide 71 may be collected by the contact portion 64. Thus, after the waste liquid tank 60 is demounted from the main housing 11, the inks on the waste liquid guide 71 may be restrained from dripping to stain inside the main housing 11.

Fourth Modified Example

Figures 8A, 8B:
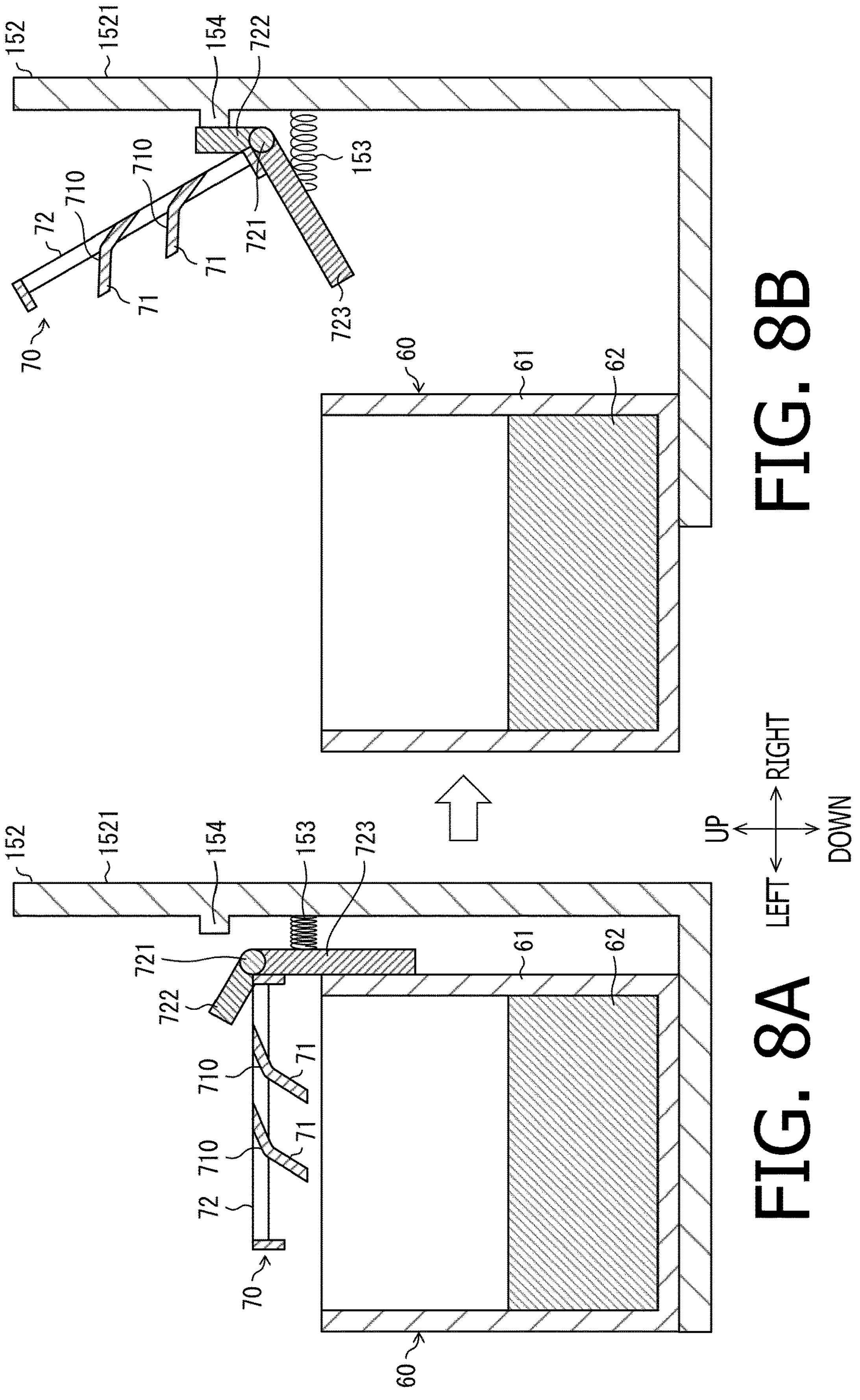
FIG. 8A illustrates a waste liquid tank mounted in a main housing.
FIG. 8B illustrates the waste liquid tank drawn outward from the main housing.

A fourth modified example, in which the compartment 152 is modified, will be described with reference to FIGS. 8A-8B. FIG. 8A illustrates the waste liquid tank 60 mounted in the main housing. FIG. 8B illustrates the waste liquid tank 60 being drawn outward from the main housing 11. The waste liquid guide 71 in the fourth modified example is, as shown in FIGS. 8A-8B, fixed inside the main housing 11.

The compartment 152 in the fourth modified example has an inclination-angle changeable assembly, which may change inclination angle of the waste liquid guide 71 when the waste liquid tank 60 is being mounted in or demounted from the main housing 11, on a wall 1521. The wall 1521 is a wall of the compartment 152 facing one of the side faces of the waste liquid tank 60 on the inner side in the mounting/demounting direction. In particular, the compartment 152 has an urging member 153 and a restrictive protrusion 154, which form the inclination-angle changeable assembly, as shown in FIGS. 8A-8B, on the wall 1521. The waste liquid guide 71 in the fourth modified example is fixed to the wall 1521 of the main housing 11 through the inclination-angle changeable assembly. Optionally, the wall 1521 may be connected to the frame 9C of the main housing 11.

The urging member 153 urges the guide retainer frame 72 from one side toward the other side in the mounting/demounting direction of the waste liquid tank 60. The urging member 153 may consist of a spring with elasticity. In particular, the urging member 153 may urge the guide retainer frame 72 from right to left in the mounting/demounting direction. The urging member 153 is connected to a receiver wall 723, which will be described below. In other words, the urging member 153 is located between the wall 1521 and the receiver wall 723.

The restrictive protrusion 154 protrudes from the wall 1521 leftward, i.e., in an outward direction from the inner side of the main housing 11. The restrictive protrusion 154 may collide with a pivot-restrictive portion 722, which will be described below, to restrict the guide retainer frame 72 from pivoting further.

The guide retainer frame 72 is pivotable with respect to the main housing 11 on an axis, which extends in a direction intersecting orthogonally with the mounting/demounting direction. The guide retainer frame 72 has, as shown in FIGS. 8A-8B, a shaft 721, the pivot-restrictive portion 722, and the receiver wall 723.

The shaft 721 is located on a rightward side of the guide retainer frame 72, i.e., on the inner side in the main housing 11. Through the shaft 721, the guide retainer frame 72 is supported pivotably by the main housing 11 to pivot with respect to the main housing 11.

The pivot-restrictive portion 722 protrudes upward from one end of the guide retainer frame 72 on the inner side in the main housing 11. In particular, the pivot-restrictive portion 722 is formed to incline to be higher toward the left from the one end of the guide retainer frame 72 on the inner side of the main housing 11.

The receiver wall 723 is located on an opposite side to the pivot-restrictive portion 722 across the guide retainer frame 72. The receiver wall 723 protrudes downward from the guide retainer frame 72. The receiver wall 723 may, in an arrangement where the waste liquid tank 60 is accommodated in the compartment 152, contact one of the side surfaces, e.g., the rightward surface, that form the waste liquid case 61 on the inner side in the main housing 11 in the mounting/demounting direction of the waste liquid tank 60.

According to the fourth modified example, for example, as shown in FIG. 8A, when the waste liquid tank 60 is pushed in the compartment 152, the waste liquid tank 60 may contact the receiver wall 723. As the waste liquid tank 60 is pushed further inward in the main housing 11, the guide retainer frame 72 may pivot counterclockwise to be set in a position where a lower face of the guide retainer frame 72 and a bottom face of the waste liquid tank 60 are parallel.

On the other hand, when the waste liquid tank 60 is drawn outward from the position where the waste liquid tank 60 is set in the compartment 152, as shown in FIG. 8B, the waste liquid tank 60 separates from the receiver wall 723. As the waste liquid tank 60 separates from the receiver wall 723, the guide retainer frame 72 may be moved by the urging force of the urging member 153 to pivot clockwise to a position where the pivot-restrictive portion 722 contacts the restrictive protrusion 154. As the guide retainer frame 72 pivots clockwise, the waste liquid guide 71 fixed to the guide retainer frame 72 may move to a position where the slant surface 710 is substantially parallel to the bottom face of the waste liquid tank 60. In this posture of the waste liquid guide 71, the inks on the waste liquid guide 71 may be prevented from dripping down from the waste liquid guide 71 while the waste liquid tank 60 is absent from the compartment 152.

According to the fourth modified example, the inclination angle of the waste liquid guides 71 may change when the waste liquid tank 60 is moved to be mounted in or demounted from the main housing 11. In other words, the inclination angle of the waste liquid guide 71 may change so that the waste liquid guide 71 may not interfere with the waste liquid tank 60 being mounted in or demounted from the main housing 11. Moreover, when the waste liquid tank 60 is absent from the main housing 11, the inclination angle of the waste liquid guide 71 may change so that the inks on the waste liquid guide 71 may be restrained from dripping in the main housing 11.

Fifth Modified Example

Figure 9:
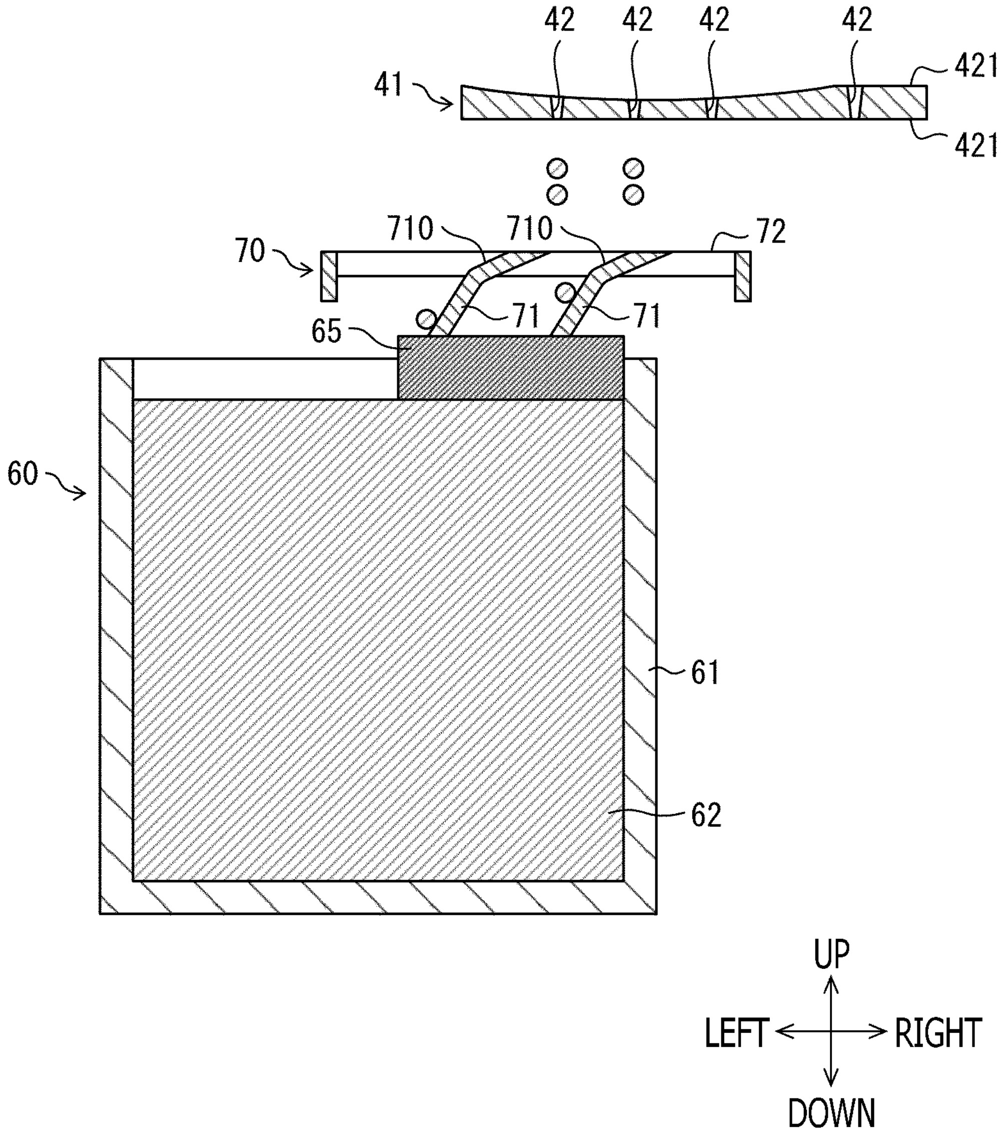
FIG. 9 illustrates arrangement of a waste liquid guide and a waste liquid tank.

A fifth modified example will be described with reference to FIG. 9. FIG. 9 illustrates a modified arrangement of the waste liquid guide 71 and the waste liquid tank 60. As shown in FIG. 9, the waste liquid tank 60 may have an absorber 65, which may pass the inks received from the waste liquid guide 71 to the waste liquid tank 60. As shown in FIG. 9, the absorber 65 is in contact with at least a part of the lower end of the waste liquid guide 71. The waste liquid guide 71 in the fifth modified example is, as shown in FIG. 9, fixed inside the main housing 11.

In particular, the absorber 65 may be arranged to contact the lower end of the waste liquid guide 71 and the ink absorber foam 62. The absorber 65 is attached to the waste liquid case 61. The absorber 65 may be made of, for example, unwoven fabric, sponge, or cotton that may absorb the inks. In this arrangement, the inks received by the waste liquid guide 71 may be absorbed by the absorber 65 and may be passed from the absorber 65 to the ink absorber foam 62 to be stored in the waste liquid tank 60.

According to the sixth modified example, even when bubbles are produced in the ink in the waste liquid tank 60, the bubbled ink may be restrained from rising and may stay lower than the lower end of the waste liquid guide 71. Moreover, the ink dripping down from the waste liquid guide 71 may be restrained from hitting the inks in the waste liquid tank 60 and scattering in mist.

Sixth Modified Example

Figure 10:
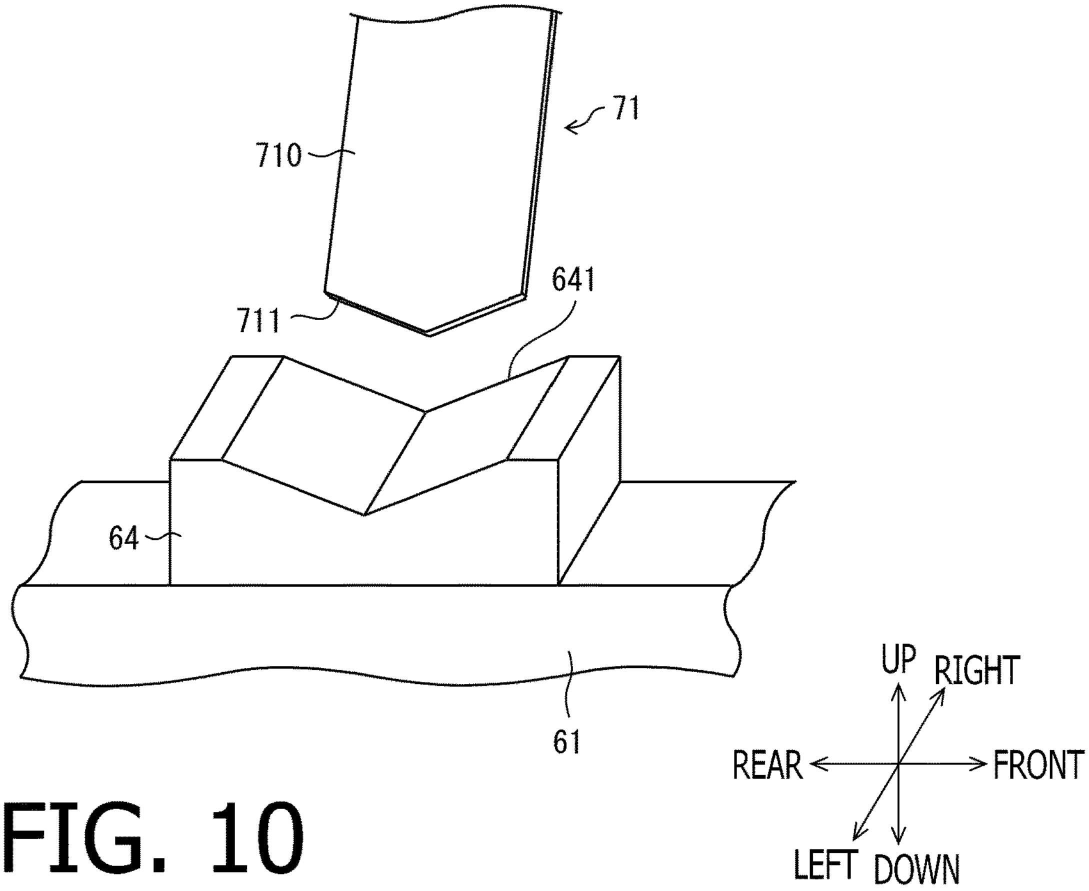
FIG. 10 is a partial view of a waste liquid tank and a waste liquid guide.

A sixth modified example will be described with reference to FIG. 10. FIG. 10 illustrates a modified example of the waste liquid tank 60 being mounted in the main housing 11, which has the waste liquid guide 71 fixed thereto. The waste liquid guide 71 in the sixth modified example is fixed inside the main housing 11.

In the sixth modified example, similarly to the third modified example, the contact portion 64 is arranged on the edge of the waste liquid tank 60 that faces the nozzle surface 421 at the position where the lower end 711 of the waste liquid guide 71 may contact the contact portion 64. The contact portion 64 is arranged on the waste liquid case 61. The contact portion 64 is in a form to fit with the lower end 711 of the waste liquid guide 71 when the waste liquid tank 60 is mounted in the main housing 11.

In particular, the lower end 711 of the slant surface 710 of the waste liquid guide 71 is tapered in a central area in the widthwise direction to point downward. On the other hand, an upper face 641 of the contact portion 64 to face the lower end 711 of the waste liquid guide 71 is dented in a form corresponding to the tapered form of the lower end 711 of the waste liquid guide 71. In this arrangement, the lower end 711 of the waste liquid guide 71 may fit with the upper face 641 of the contact portion 64.

According to the sixth modified example, when the waste liquid tank 60 is being mounted in the main housing 11, the lower end 711 of the waste liquid guide 71 may fit with the upper face 641 of the contact portion 64. When the waste liquid tank 60 is being demounted from the main housing 11, the inks on the lower end 711 of the waste liquid guide 71 may be wiped off by the contact portion 64; therefore, while the waste liquid tank 60 is absent from the main housing 11, the ink on the waste liquid guides 71 may be restrained from dripping or staining inside the main housing 11.

Seventh Modified Example

Figure 11:
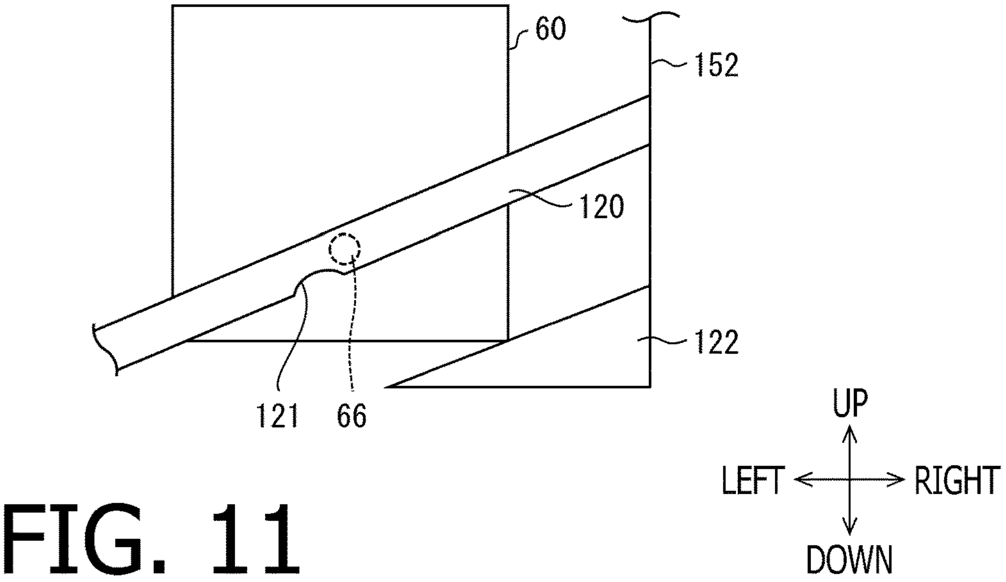
FIG. 11 illustrates a compartment and a waste liquid tank.

A seventh modified example, in which the waste liquid tank 60 and the compartment 152 are modified, will be described with reference to FIGS. 11 and 12A-12C. FIG. 11 is an illustrative view of the modified waste liquid tank 60 being mounted in the modified compartment 152. FIG. 12A illustrates the waste liquid tank 60 being in an earlier stage to be mounted in the modified compartment 152, FIG. 12B illustrates the waste liquid tank 60 being in an intermediate stage to be mounted in the modified compartment 152, and FIG. 12C illustrates the waste liquid tank 60 being in a final stage to be mounted completely in the modified compartment 152. The waste liquid guide 71 in the seventh modified example is fixed inside the compartment 152 in the main housing 11.

The compartment 152 in the seventh modified example has a guide rail 120, which slants to be higher from the outer side toward the inner side, i.e., from left to right, gradually in the mounting direction of the waste liquid tank 60. In other words, the guide rail 120 is in an uphill inclination from the outer side toward the inner side in the mounting direction of the waste liquid tank 60. The guide rail 120 is formed to have a groove (not shown), and the waste liquid tank 60 has a guide rail contact portion 66, which slidably fits in the groove.

As shown in FIG. 11, the waste liquid tank 60 has the guide rail contact portion 66, where the waste liquid tank 60 contacts the guide rail 120. The guide rail contact portion 66 protrudes frontward from the frontward face of the waste liquid tank 60. The guide rail contact portion 66 is located in a substantially vertically central area on the frontward face or at a position lower than the vertical center of the frontward face.

The guide rail 120 has a restrictive portion 121, which may restrict the guide rail contact portion 66 from moving further leftward, i.e., downward, along the guide rail 120. The restrictive portion 121 may not restrict the guide rail contact portion 66 from moving beyond the restrictive portion 121 when the guide rail contact portion 66 moves along with the waste liquid tank 60 being mounted in or demounted from the compartment 152. In other words, the guide rail contact portion 66 may move beyond the restrictive portion 121 when the waste liquid tank 60 is being mounted in or demounted from the compartment 152. On the other hand, the restrictive portion 121 may restrict the guide rail contact portion 66 from moving beyond the restrictive portion 121 when the guide rail contact portion 66 moves along with the waste liquid tank 60 moving downward by the weight of the waste liquid tank 60. In other words, the guide rail contact portion 66 may not move beyond the restrictive portion 121 when the waste liquid tank 60 moves downward by gravity.

Moreover, a guide 122 having a slant surface, which inclines to be higher from the outer side toward the inner side in the mounting direction of the waste liquid tank 60, is arranged on a bottom of the compartment 152. An inclination angle of the guide rail 120 and an inclination angle of the guide 122 are substantially equal. Therefore, the slant surface of the guide 122 is in an uphill inclination from the outer side toward the inner side in the mounting direction of the waste liquid tank 60. When the waste liquid tank 60 is being mounted in the compartment 152, at least a part of the bottom surface of the waste liquid tank 60 may contact the slant surface of the guide 122. A length of the slant surface of the guide 122 in the front-rear direction is at least equal to, and preferably longer than, the length of the waste liquid tank 60 in the front-rear direction.

As the waste liquid tank 60 is pushed inward to be mounted in the compartment 152, the guide rail contact portion 66 may contact the guide rail 120 at a position where a rightward end of the bottom of the waste liquid tank 60 reaches the guide 122. As the waste liquid tank 60 is pushed further inward, the waste liquid tank 60 may move on the slant surface of the guide 122 inward from the outer side in the mounting direction, and the guide rail contact portion 66 may move along the guide rail 120 inward from the outer side in the mounting direction.

The guide rail 120 and the slant surface of the guide 122 incline uphill from the outer side toward the inner side in the mounting direction; therefore, the waste liquid tank 60 and the guide rail contact portion 66 moving from the outer side toward the inner side in the mounting direction may climb higher. When the waste liquid tank 60 is pushed to a position where the guide rail contact portion 66 climbs over the restrictive portion 121, a surface of the guide rail contact portion 66 on the outer side may contact a surface of the restrictive portion 121 on the inner side in the mounting direction, and the guide rail contact portion 66 and the waste liquid tank 60 may be restricted from moving outward in the mounting direction. Thus, the waste liquid tank 60 may be located at a correct position with respect to the compartment 152.

As described above, when the waste liquid tank 60 is mounted in the compartment 152, the waste liquid tank 60 may move to climb higher as the waste liquid tank 60 is pushed inward from the outer side in the mounting direction, and when the waste liquid tank 60 is located at the predetermined position, the waste liquid tank 60 may be restricted from moving outward from the predetermined position. Therefore, the waste liquid tank 60 may be located at the correct position with respect to the compartment 152, and leakage of the ink due to displacement of the waste liquid tank 60 in the compartment 152 may be prevented.

According to the seventh modified example, as shown in FIGS. 12A-12C, the waste liquid tank 60 may be mounted in the compartment 152 without being interfered by the waste liquid guide 71 arranged in the main housing 11. It may be noted that, in FIGS. 12A-12C, illustration of the guide rail 120 is omitted for ease of visual explanation. As shown in FIG. 12A, in the earlier stage of mounting the waste liquid tank 60 in the compartment 152, the vertical position of the waste liquid tank 60 may be lower than the position of the waste liquid guide 71, where the waste liquid tank 60 may not contact the waste liquid guide 71. In other words, at the position in the earlier stage, the waste liquid guide 71 may not interfere with the waste liquid tank 60 being pushed in.

As shown in FIG. 12B, in the intermediate stage of mounting the waste liquid tank 60 in the compartment 152, in which the waste liquid tank 60 is pushed further inward, the waste liquid tank 60 is lifted to a higher position in the vertical direction, and the waste liquid guide 71 may contact the contact portion 64 on the waste liquid tank 60. The contact portion 64 colliding with the waste liquid guide 71 may be deformed by a force from the upper side, and while the contact portion 64 is deformed, the waste liquid tank 60 may be allowed to move further inward.

As shown in FIG. 12C, in the final stage of mounting the waste liquid tank 60 in the compartment 152, in which the waste liquid tank 60 is completely mounted in the compartment 152, two pieces of the waste liquid guide 71 climbed over the edge of the waste liquid case 61 on the inner side are located inside the waste liquid case 61. Meanwhile, the waste liquid tank 60 is lifted to a higher position, and the position of the lower end of the waste liquid guide 71 is lower than at least the upper edge of the contact portion 64.

Thus, when the waste liquid tank 60 is at the position, where the side face of the waste liquid case 61 on the inner side in the mounting direction reaches the position below the waste liquid guide 71, the waste liquid tank 60 is located at the lower position, and the waste liquid tank 60 may not contact the waste liquid guide 71. In other words, the waste liquid guide 71 may not interfere with entry of the waste liquid tank 60. When the waste liquid tank 60 is pushed to the position, at which the inner side of the waste liquid case 61 and the waste liquid guide 71 overlap in the vertical direction, the waste liquid tank 60 is at the higher position, and the distance between the waste liquid guide 71 and the waste liquid tank 60 is shortened. Therefore, the inks flowing on the waste liquid guide 71 may be collected in the waste liquid tank 60 easily. In other words, the waste liquid tank 60 may be located at the correct position with respect to the waste liquid guide 71, and leakage of the ink due to displacement of the waste liquid tank 60 in the compartment 152 may be prevented.

Eighth Modified Example

An eighth modified example will be described with reference to FIGS. 13A-13C. FIG. 13A is a perspective view of a modified example of the compartment 152 and the waste liquid tank 60 viewed from a position on the left. FIG. 13B is a top plan view of the modified waste liquid tank 60. FIG. 13C is a cross-sectional partial view of the modified waste liquid tank 60 sectioned at line A-A shown in FIG. 13A. The waste liquid guide 71 in the eighth modified example is fixed to the waste liquid tank 60.

The compartment 152 in the eighth modified example has a positioning formation to locate the waste liquid tank 60 at a correct position with respect to the recording head 41. The compartment 152 has, as shown in FIG. 13A, a housing side locator 130 and a waste liquid guide side locator 131. It may be noted that, in FIG. 13A, a leftward portion of the guide rail 9A is omitted for ease of visual explanation; however, in practice, the guide rail 9A is extended leftward to a position to vertically overlap the waste liquid tank 60.

The housing side locator 130 is arranged on the frame 9C that supports the guide rail 9A, on which the carriage 40 with the recording head 41 mounted thereon may run. The housing side locator 130 has a protrusion protruding leftward from the frame 9C. The housing side locator 130 may be, for example, made of synthetic resin, and may be attached to a leftward surface of the frame 9C. While FIG. 13A shows the housing side locator 130 having two (2) protrusions, a number of the protrusion(s) is not necessarily be limited to two but may be, for example, one, three, or more as long as the number corresponds to a number of recesses formed in the waste liquid guide side locator 131.

The waste liquid guide side locator 131 is arranged on the guide retainer frame 72 that retains the waste liquid guide 71. The waste liquid guide side locator 131 is in a form recessed from a surface of the guide retainer frame 72 that faces the housing side locator 130. While FIG. 13A shows the waste liquid guide side locator 131 having two (2) recesses, a number of the recess(es) is not necessarily be limited to two but may be, for example, one, three, or more as long as the number corresponds to the number of protrusions of the housing side locator 130.

Moreover, the forms of the housing side locator 130 and the waste liquid guide side locator 131 may not necessarily be limited to those shown in FIG. 13A, but the housing side locator 130 may be recess(es), and the waste liquid guide side locator 131 may be protrusion(s). In other words, the housing side locator 130 and the waste liquid guide side locator 131 may be in any forms as long as the housing side locator 130 and the waste liquid guide side locator 131 are mutually engageable.

The housing side locator 130 and the waste liquid guide side locator 131 are located at the same position in the vertical direction so that the housing side locator 130 and the waste liquid guide side locator 131 may contact each other. While the housing side locator 130 and the waste liquid guide side locator 131 are placed at positions to align in the front-rear direction, the waste liquid tank 60 may be pushed inward in the compartment 152 from the outer side in the mounting direction, and the waste liquid guide side locator 131 may contact housing side locator 130. Thereby, the protrusions of the housing side locator 130 may enter the recesses in the waste liquid guide side locator 131, and the housing side locator 130 and the waste liquid guide side locator 131 may be engaged. Thus, the waste liquid tank 60 may be located at the correct position with respect to the recording head 41. Accordingly, the waste liquid guide 71 fixed to the waste liquid tank 60 may be located at the correct position with respect to the recording head 41, and leakage of the ink due to displacement of the waste liquid tank 60 from the recording head 41 may be prevented. Optionally, the compartment 152 may have a guide on the bottom thereof, and the waste liquid tank 60 may be placed to align with the guide and pushed there-along to be guided in the compartment 152.

The housing side locator 130 has a face 130*a* facing one side in the vertical direction, which is the direction intersecting orthogonally with the nozzle surface 421 of the recording head 41; a face 13*b* facing one side in the front-rear direction, which is the direction to convey the sheet P in the conveyer path R; and a face 130*c* facing one side in the widthwise direction, which is the scanning direction for the recording head 41. Meanwhile, the waste liquid guide side locator 131 has faces that correspond to the faces 130*a*, 130*b*, 130*c*. When the waste liquid guide side locator 131 contacts the housing side locator 130, the waste liquid guide side locator 131 may be restricted by the face 130*a* from moving in the vertical direction. Moreover, the waste liquid guide side locator 131 may be restricted by the face 130*b* from moving in the front-rear direction. Further, the waste liquid guide side locator 131 may be restricted by the face 130*c* from moving in the widthwise direction. Thus, the faces of the housing side locator 130 may restrict the waste liquid guide side locator 131 from moving in the vertical direction, the front-rear direction, and the widthwise direction. Accordingly, the waste liquid tank 60 may be located at the correct position with respect to the recording head 41.

The guide retainer frame 72 has, in a top plan view, an approximate form of U, which surrounds the waste liquid guide 71 and is open toward the housing side locator 130, and retains the waste liquid guide 71 in the surrounded central area. The guide retainer frame 72 is connected to the upper face of the waste liquid tank 60 through a connector 67. The connector 67 has, in a top plan view, an approximate form of U, which is open toward the housing side locator 130, and accommodates the guide retainer frame 72 in the area open toward the housing side locator 130. The upper face of the waste liquid tank 60 is open at a part overlapping the waste liquid guide 71, and the ink flowing on the waste liquid guide 71 may be collected in the waste liquid tank 60 through the opening.

As shown in FIGS. 13A-13C, between the guide retainer frame 72 and the connector 67 of the waste liquid tank 60, gaps G in the vertical direction, the front-rear direction, and the widthwise direction are reserved. In other words, the guide retainer frame 72 is connected to the waste liquid tank 60 with margins to play in the vertical direction, the front-rear direction, and the widthwise direction. Accordingly, the waste liquid tank 60 is allowed to move within the gaps G, and the position of the waste liquid tank 60 may be adjusted within the gaps G. Therefore, for example, when the waste liquid guide side locator 131 engages with the housing side locator 130, the waste liquid tank 60 may be restrained from being pulled and tilting toward the housing side locator 130, and the waste liquid tank 60 may be located at the correct position.

As shown in FIG. 13B, in the gap G between the guide retainer frame 72 and the connector 67 in the widthwise direction, an urging member 731 to urge the guide retainer frame 72 in the widthwise direction is arranged. FIG. 13B shows a top plan view of the guide retainer frame 72 and the connector 67 on the upper side of the waste liquid tank 60. The guide retainer frame 72 and the connector 67 have a restricting structure, which may restrict the guide retainer frame 72 from moving in the widthwise direction. In particular, as shown in FIGS. 13A-13B, the guide retainer frame 72 has recesses on the frontward face and the rearward face thereof, and the connector 67 has protrusions in a form corresponding to the recesses in the guide retainer frame 72 on the rearward face and the frontward face thereof. Meanwhile, as shown in FIG. 13C, in the gap between the guide retainer frame 72 and the connector 67 in the vertical direction, an urging member 732 to urge the guide retainer frame 72 in the vertical direction is arranged. FIG. 13C shows a cross-sectional view of the guide retainer frame 72 and the connector 67 of the waste liquid tank 60 sectioned at line A-A shown in FIG. 13A. In order to limit movability of the guide retainer frame 72 in the vertical direction, the guide retainer frame 72 is fastened to the upper face of the waste liquid tank 60 with a screw 734 with the margin reserved between the guide retainer frame 72 and the upper face of the waste liquid tank 60. The urging member 731 and the urging member 732 may be, for example, springs with elasticity.

Thus, the waste liquid guide side locator 131 may be urged against the face 130*a* on one side in the vertical direction and the face 130*c* on one side in the widthwise direction, and the waste liquid guide side locator 131 may contact the housing side locator 130 in the vertical direction and the widthwise direction. Accordingly, the waste liquid tank 60 may be located at the correct position in the vertical direction and the widthwise direction.

Ninth Modified Example

A ninth modified example, in which the compartment 152 and the waste liquid tank 60 are modified, will be described with reference to FIGS. 14A-14B. FIG. 14A is a perspective view of the modified compartment 152 and the modified waste liquid tank 60 viewed from a position on the left. FIG. 14B is a side view of the modified compartment 152 and the modified waste liquid tank 60 viewed from a position on the front. The waste liquid guide 71 in the ninth modified example is fixed to the waste liquid tank 60.

The compartment 152 in the ninth modified example has a positioning formation to locate the waste liquid tank 60 at a correct position with respect to the recording head 41. The compartment 152 has a housing side locator 140 as the positioning formation. Meanwhile, the waste liquid tank 60 has a waste liquid tank side locator 141.

The housing side locator 140 is, as shown in FIG. 14A, arranged on a bottom side of the guide rail 9A, on which the carriage 40 with the recording head 41 mounted thereon may run. In a sideward view from the left, the housing side locator 140 has an approximate form of C rotated clockwise by 90 degrees. The housing side locator 140 has, as shown in FIGS. 14A-14B, a face 140*a* that faces one side in the vertical direction, a face 140*b* that faces one side in the front-rear direction, and a face 140*c* that faces one side in the widthwise direction. It may be noted that, in FIG. 14A, a leftward portion of the guide rail 9A is omitted for ease of visual explanation; however, in practice, the guide rail 9A is extended leftward to a position to vertically overlap the waste liquid tank 60.

The waste liquid tank side locator 141 is arranged on the upper side of the guide retainer frame 72 arranged on the upper face of the waste liquid tank 60. The waste liquid tank side locator 141 may either be fixed to the guide retainer frame 72 or formed integrally with the guide retainer frame 72. The waste liquid tank side locator 141 is formed to protrude from the upper face of the guide retainer frame 72 and has a form to fit in the recessed form of the housing side locator 140.

The housing side locator 140 and the waste liquid tank side locator 141 are located at positions in the vertical direction to coincide with each other so that the housing side locator 140 and the waste liquid tank side locator 141 may contact each other. As shown in FIG. 14A, while the housing side locator 140 and the waste liquid tank side locator 141 are placed at positions to align in the front-rear direction, the waste liquid tank 60 may be pushed inward in the compartment 152 from the outer side in the mounting direction, i.e., from left to right, and the waste liquid tank side locator 141 may contact housing side locator 140. Thereby, the waste liquid tank side locator 141 may enter the recess in the housing side locator 140, and the housing side locator 140 and the waste liquid tank side locator 141 may be engaged.

The waste liquid tank side locator 141 has faces that correspond to the faces 140*a*, 140*b*, 140*c* of the housing side locator 140. When the waste liquid tank side locator 141 contacts the housing side locator 140, the waste liquid tank side locator 141 may be restricted by the face 140*a* from moving in the vertical direction. Moreover, the waste liquid tank side locator 141 may be restricted by the face 140*b* from moving in the front-rear direction. Further, the waste liquid tank side locator 141 may be restricted by the face 140*c* from moving in the widthwise direction. Thus, the faces 140*a*-140*c* of the housing side locator 140 may restrict the waste liquid tank side locator 141 from moving upward, in the front-rear direction, and in the widthwise direction. Accordingly, the waste liquid tank 60 may be restricted from moving in the upward direction, the front-rear direction, and the widthwise direction and may be located at the correct position with respect to the recording head 41.

According to the ninth modified example, the compartment 152 has an urging board 144 and an urging member 143 to urge the waste liquid tank 60, as shown in FIG. 14B. The urging member 143 may, for example, consist of springs and may urge the waste liquid tank 60 mounted on the urging board 144 upward. The waste liquid tank 60 at the position where the waste liquid tank side locator 141 contacts the housing side locator 140 may be urged upward, and the waste liquid tank side locator 141 may contact the housing side locator 140. Thereby, the waste liquid tank 60 may be located at the correct position. Accordingly, the waste liquid guide 71 fixed to the waste liquid tank 60 may be located at the correct position with respect to the recording head 41, and leakage of the ink due to displacement of the waste liquid tank 60 from the recording head 41 may be prevented. Optionally, rather than the arrangement, in which the compartment 152 has the urging board 144 and the urging member 143, the guide retainer frame 72 may be connected to the waste liquid tank 60 with a margin to play between the guide retainer frame 72 and the waste liquid tank 60. In this arrangement, the waste liquid tank 60 may be located at the correct position in the similar manner as the eighth modified example.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A liquid discharging apparatus, comprising:

a sheet conveyer path;

a liquid discharging head including nozzles for discharging liquid;

a cap configured to cover the liquid discharging head;

a liquid receiver located at a position different from the cap, the liquid receiver being configured to receive the liquid discharged from the liquid discharging head; and a waste liquid tank demountably mounted in a housing of the liquid discharging apparatus, the waste liquid tank being configured to store the liquid received by the liquid receiver, wherein the waste liquid tank is located at a position where the waste liquid tank at least partly overlaps a nozzle surface of the liquid discharging head in a direction intersecting orthogonally with the nozzle surface.

2. The liquid discharging apparatus according to claim 1, wherein the liquid receiver includes a waste liquid guide having a slant surface for guiding the liquid discharged from the liquid discharging head to the waste liquid tank.

3. The liquid discharging apparatus according to claim 2, wherein the waste liquid guide is located between the liquid discharging head and the waste liquid tank in the direction intersecting orthogonally with the nozzle surface of the liquid discharging head.

4. The liquid discharging apparatus according to claim 2, wherein the waste liquid guide is fixed to the waste liquid tank.

5. The liquid discharging apparatus according to claim 4, further comprising:

a housing side locator arranged on one of a rail, on which a carriage with the liquid discharging head mounted thereon is configured to run, and a frame supporting the rail; and a waste liquid guide side locator arranged on a retainer retaining the waste liquid guide, the waste liquid guide side locator being configured to contact the housing side locator in a condition where the waste liquid tank is mounted in the housing.

6. The liquid discharging apparatus according to claim 5, wherein the housing side locator has a face configured to restrict the waste liquid guide side locator from moving in a scanning direction of the liquid discharging head, a face configured to restrict the waste liquid guide side locator from moving in the direction intersecting orthogonally with the nozzle surface of the liquid discharging head, and a face configured to restrict the waste liquid guide side locator from moving in a conveying direction to convey a sheet in the sheet conveyer path.

7. The liquid discharging apparatus according to claim 6, wherein the retainer is urged by an urging member in the scanning direction and in the direction intersecting orthogonally with the nozzle surface of the liquid discharging head.

8. The liquid discharging apparatus according to claim 6, wherein the waste liquid tank and the retainer are connected with each other reserving gaps there-between in the scanning direction, in the direction intersecting orthogonally with the nozzle surface of the liquid discharging head, and in the conveying direction.

9. The liquid discharging apparatus according to claim 5, wherein the housing side locator and the waste liquid guide side locator are in forms engageable with each other.

10. The liquid discharging apparatus according to claim 5, wherein the waste liquid tank is, when located at a position where the waste liquid guide side locator contacts the housing side locator, urged in the direction intersecting orthogonally with the nozzle surface of the liquid discharging head.

11. The liquid discharging apparatus according to claim 2, wherein the waste liquid guide is fixed to a frame in the housing.

12. The liquid discharging apparatus according to claim 11, wherein the waste liquid guide is located at a position where the waste liquid guide at least partly overlaps the waste liquid tank in the direction intersecting orthogonally with the nozzle surface of the liquid discharging head.

13. The liquid discharging apparatus according to claim 11, wherein a lower end of the waste liquid guide is located to be higher than an edge of the waste liquid tank facing the nozzle surface of the liquid discharging head.

14. The liquid discharging apparatus according to claim 11, further comprising a contact portion, the contact portion being located on an edge of the waste liquid tank facing a nozzle surface of the liquid discharging head, the contact portion being configured to contact a lower end of the waste liquid guide when the waste liquid tank is being mounted in and demounted from the housing.

15. The liquid discharging apparatus according to claim 14, wherein the contact portion is in a form engageable with the lower end of the waste liquid guide mounted in the housing.

16. The liquid discharging apparatus according to claim 11, further comprising an absorber configured to pass the liquid from the waste liquid guide to the waste liquid tank, wherein the absorber is in contact with at least a part of a lower end of the waste liquid guide.

17. The liquid discharging apparatus according to claim 11, further comprising:

a guide rail arranged in the housing, the guide rail slanting to be higher from an outer side toward an inner side in a direction to mount the waste liquid tank in the housing; and a guide rail contact portion arranged on the waste liquid tank, the guide rail contact portion being configured to, in a condition where the waste liquid tank is mounted in the housing, contact the guide rail and enable the waste liquid tank to move along the guide rail.

18. The liquid discharging apparatus according to claim 2, further comprising an inclination angle changeable assembly located in the housing, the inclination angle changeable assembly being configured to change an inclination angle of the waste liquid guide in a condition where the waste liquid tank is being mounted in and demounted from the housing.

19. The liquid discharging apparatus according to claim 1, wherein the waste liquid tank is located to be lower than the liquid discharging head in the direction intersecting orthogonally with the nozzle surface of the liquid discharging head.

20. A liquid discharging apparatus, comprising:

a sheet conveyer path;

a liquid discharging head including nozzles for discharging liquid;

a cap configured to cover the liquid discharging head;

a liquid receiver located at a position different from the cap, the liquid receiver being configured to receive the liquid discharged from the liquid discharging head; and a waste liquid tank demountably mounted in a housing of the liquid discharging apparatus, the waste liquid being configured to store the liquid received by the liquid receiver, wherein the waste liquid tank is located on an outer side from the sheet conveyer path in a scanning direction of the liquid discharging head.

21. A liquid discharging apparatus, comprising:

a sheet conveyer path;

a liquid discharging head including nozzles for discharging liquid;

a cap configured to cover the liquid discharging liquid;

a liquid receiver located at a position different from the cap, the liquid receiver being configured to receive the liquid discharged from the liquid discharging head; and a waste liquid tank demountably mounted in a housing of the liquid discharging apparatus, the waste liquid tank being configured to store the liquid received by the liquid receiver, wherein the waste liquid tank is located on an opposite side to the cap across the sheet conveyer path in a scanning direction of the liquid discharging head.

22. The liquid discharging apparatus according to claim 21, further comprising a waste liquid flow path connecting the cap and the waste liquid tank, wherein the cap is configured to receive the liquid discharged from the liquid discharging head at a position different from the liquid receiver, and wherein the liquid received by the cap is transported to the waste liquid tank through the waste liquid flow path.

23. The liquid discharging apparatus according to claim 22, wherein the waste liquid tank is connected to an end of the waste liquid flow path.

24. A waste liquid tank, comprising:

a container configured to store liquid discharged from a liquid discharging head; and a waste liquid guide having a slant surface for guiding the liquid discharged from the liquid discharging head to the container, wherein the waste liquid tank is demountably mountable in a housing of a liquid discharging apparatus, and wherein the waste liquid guide is fixed to the waste liquid tank.

* * * * *